United States Patent [19]
Moriya et al.

[11] Patent Number: 5,597,051
[45] Date of Patent: Jan. 28, 1997

[54] LUBRICATING OIL SUPPLY UNIT FOR TWO-CYCLE ENGINES

[75] Inventors: Takao Moriya; Masaya Suenari, both of Iwata, Japan

[73] Assignee: Yamaha Hatsudoki Kabushiki Kaisha, Iwata, Japan

[21] Appl. No.: 221,943

[22] Filed: Jun. 6, 1994

[30] Foreign Application Priority Data

| Apr. 2, 1993 | [JP] | Japan | 5-077027 |
| Apr. 23, 1993 | [JP] | Japan | 5-097509 |

[51] Int. Cl.⁶ ............................... F01M 1/06; F01M 3/02
[52] U.S. Cl. .................. 184/6.1; 184/6.4; 184/6.5; 184/6.8; 184/33; 184/34; 123/73 AD; 123/196 R; 417/45; 417/500
[58] Field of Search ................ 184/6.1, 6.4–6.6, 184/6.8, 33, 34, 108; 123/196 R, 73 AD; 417/500, 13, 18, 22, 32, 44.1, 44.11, 45

[56] References Cited

U.S. PATENT DOCUMENTS

| 4,045,343 | 8/1977 | Achener et al. |
| 4,326,837 | 4/1982 | Gilson et al. |
| 4,638,771 | 1/1987 | Mori ........................ 123/73 AD |
| 4,774,918 | 10/1988 | Kurio et al. ............... 123/196 R |
| 4,812,727 | 3/1989 | Sakai et al. |
| 4,904,163 | 2/1990 | Tachi et al. |

FOREIGN PATENT DOCUMENTS

| 0481376 | 4/1992 | European Pat. Off. |
| 731629 | 2/1943 | Germany |
| 0191807 | 7/1990 | Japan ......................... 123/196 R |
| 0187214 | 7/1993 | Japan ......................... 123/196 R |
| 278283 | 10/1927 | United Kingdom |
| 2107800 | 5/1983 | United Kingdom |
| 2238919 | 6/1991 | United Kingdom |

OTHER PUBLICATIONS

European Search Reported dated Aug. 1, 1994.

*Primary Examiner*—Edward K. Look
*Assistant Examiner*—Christopher Verdier
*Attorney, Agent, or Firm*—Knobbe, Martens, Olson & Bear

[57] ABSTRACT

A lubricating system for a machine such as a two-cycle internal combustion engine including a reciprocating pump that pumps a finite amount of lubricant during a single pumping stroke and a stepper motor for operating the pump through incremental phases of movement each less than a stroke. The lubricant requirements of the machine are determined and the driving increments are adjusted so as to provide a pumping stroke when the lubricant consumption of the machine reaches the output of the pump. Various arrangements of stepper motors and control arrangements are disclosed for controlling the amount and timing of the lubricate delivery.

42 Claims, 28 Drawing Sheets

LUBRICATING OIL SUPPLY UNIT FOR TWO-CYCLE ENGINES

BACKGROUND OF THE INVENTION

This invention relates to a lubricating oil supply unit for machines and particularly a system for lubricating two-cycle internal combustion engines.

The necessity for lubricating mechanisms having moving parts is well known. Various types of lubricating systems have been proposed including both closed systems in which the lubricant is recirculated and so-called open systems wherein the lubricant is supplied to the mechanism and dissipated to the atmosphere during the mechanism operation. Although the latter type of system has the advantage of simplicity, the discharge of lubricant to the atmosphere can cause obvious problems.

Internal combustion engines are a specific example of mechanisms which require lubrication. Generally four-cycle engines are lubricated by closed systems while two-cycle engines, because of their very nature, are lubricated by open systems. Although it was previously the practice to lubricate a two-cycle engine by mixing lubricant with the which it consumed, these lubrication methods are not at all satisfactory because they provide the same amount of lubricant under widely varying running conditions while the actual engine requirements are different. In addition, they tend to provide excess lubricant so that the most severe conditions will be met and thus there is a large amount of lubricant consumed and discharged to the atmosphere.

Systems have been proposed for providing direct delivery of lubricant to the engine and the measuring of the amount of lubricant required and supplying only that amount of lubricant required for a given running condition. Conventionally these systems have employed lubricant pumps that are driven by the engine with the amount of lubricant varied by either changing the delivery intervals for the lubricant or by changing the amount of lubricant pumped by the pump during each cycle. Although these systems offer more accurate control of the amount of lubricant than when it is mixed with the fuel, they still have some disadvantages.

For example, if the delivery interval is changed in order to control the amount of lubricant delivered to the engine, the effect of internal leakage within the pump itself cannot be ignored. That is, the amount of lubricant actually pumped is not that which is the theoretical capacity of the pump. For example, with a piston-type pump, the piston displaces a certain volume of, fluid during each pumping cycle but the volume of fluid that is actually delivered is not equaled to the displacement volume of the piston during its stroke due to internal leakage. Of course, the amount of leakage will vary with the pump operation and thus it is somewhat difficult to ensure accurate amount of lubricant delivery with this type of system. These problems are particularly acute when the system is providing lubricant for a fairly long delivery period since the amount of internal leakage will obviously increase and hence the actual amount of oil supplied decreases as does the accuracy of the oil supply.

If the pump stroke is varied in response to engine conditions, then a complicated feedback system is required and the mechanism for controlling the amount of lubricant delivered per stroke of the pump becomes complicated and costly.

It is, therefore, a principal object of this invention to provide an improved lubricant delivery system for a machine wherein the amount of lubricant delivered can be accurately controlled and internal pumping losses minimized.

It is a further object of this invention to provide an, improved method and apparatus for controlling the supply of lubricant to a two-cycle internal combustion engine. It has been determined in accordance with this invention that the amount of lubricant supplied to an engine can be more accurately controlled if the lubricant supply incorporates a pumping device that pumps a finite amount of lubricant during a single cycle of its operation. This lubricant pump is then driven by a drive that is operated incrementally with the increments being chosen to satisfy the instantaneous lubricant requirements of the engine. Once the requisite number of increments have been met, then the lubricant pump will deliver a finite amount of lubricant. With such an arrangement, the internal leakage of the pump will be constant under all conditions and hence this internal leakage will not adversely effect the accuracy of the lubricant amount.

With such a type of lubricant system, the use of complicated feedback controls can be avoided. However, it is also desirable to insure that the actuate position of the pump during its cycle is accurately monitored so as to avoid possible errors.

It is, therefore, a still further object of the invention to provide a lubrication supply system of this type and further including means for monitoring the condition of the pump and altering its operation in the event discrepancies are encountered.

With this type of lubricating system, the drive for the pump conveniently can employ an electrical stepping motor. However, the output of such stepping motors can vary in response to the electrical power applied to it. Therefore, it is a still further object of this invention to provide an improved electrical stepping motor that can be operated so as to provide equal increments of movement regardless of the voltage available to drive the stepping motor.

In conjunction with stepping motors, it is obviously desirable to reduce the amount of power consumed so as to reduce the possible discrepancies in pump output or pump condition due to variations in voltage. It is, therefore, a still further object of this invention to provide an improved type of stepping motor wherein power consumption is reduced.

With the use of stepping motors, conditions may occur that the motor will become heated and this can effect the operation of the motor and also the amount of lubricant supplied by the lubricant pump that is driven by the stepping motor. It is, therefore, a still further object of this invention to provide an improved arrangement and stepping motor where in the drive for the stepping motor is such that the temperature is maintained at a low level.

The low power consumption and temperatures are particularly important with using stepping motors. In conventional applications for stepping motors, the stepping motor does not operate over long time intervals, but rather only operates to achieve small adjustments under most circumstances. However, when a stepping motor is used for driving a lubricant supply, then it is driven much more frequently than with conventional operations and the maintenance of low power consumptions and low temperatures are particularly important.

It is, therefore, a still further object of this invention to provide an improved stepping motor that can be on a relatively continuous basis and yet with low power consumptions and at low heat generation.

SUMMARY OF THE INVENTION

A first feature of this invention is adapted to be embodied in a system for lubricating a machine and a method of lubricating a machine that includes a pump that is operable through a fixed range of movement for delivering a fixed amount of lubricant only upon movement through the fixed range. A drive is provided for driving the pump in incremental steps of movement each less than the fixed range of the pump. A sensor is provided for sensing at least one machine running condition.

In accordance with an apparatus for performing the invention, a lubricant consumption determinator determines the consumption of lubricant by the machine from the output of the sensor. Operating means operate the drive to effect a step of movement of the drive upon a predetermined amount of lubricant consumption.

In accordance with a method for performing the invention, the lubricant consumption is determined by the output of the sensor and the drive is operated to effect a step of movement of the pump upon a predetermined amount of lubricant consumption.

Another feature of the invention is adapted to be embodied in a lubricant pump of the type that supplies a fixed amount of lubricant during a fixed range of movement of the pump element. The pump element is driven in increments and the fixed range of movement is accomplished with a predetermined number of increments. A sensor is provided for determining when the pump element is in a position indicative of the final position of the fixed range and the output of this sensor is compared with the number of increments driven to determine if there is a discrepancy in the position of the pump element from the desired position.

Another feature of the invention is adapted to be embodied in a stepping motor having first and second stator windings. The stepping motor is operated so as to effect its operation by energizing either one or both of the windings depending upon the conditions.

DETAILED DESCRIPTION OF THE PREFERRED EMBODIMENTS OF THE INVENTION

Figure 1:
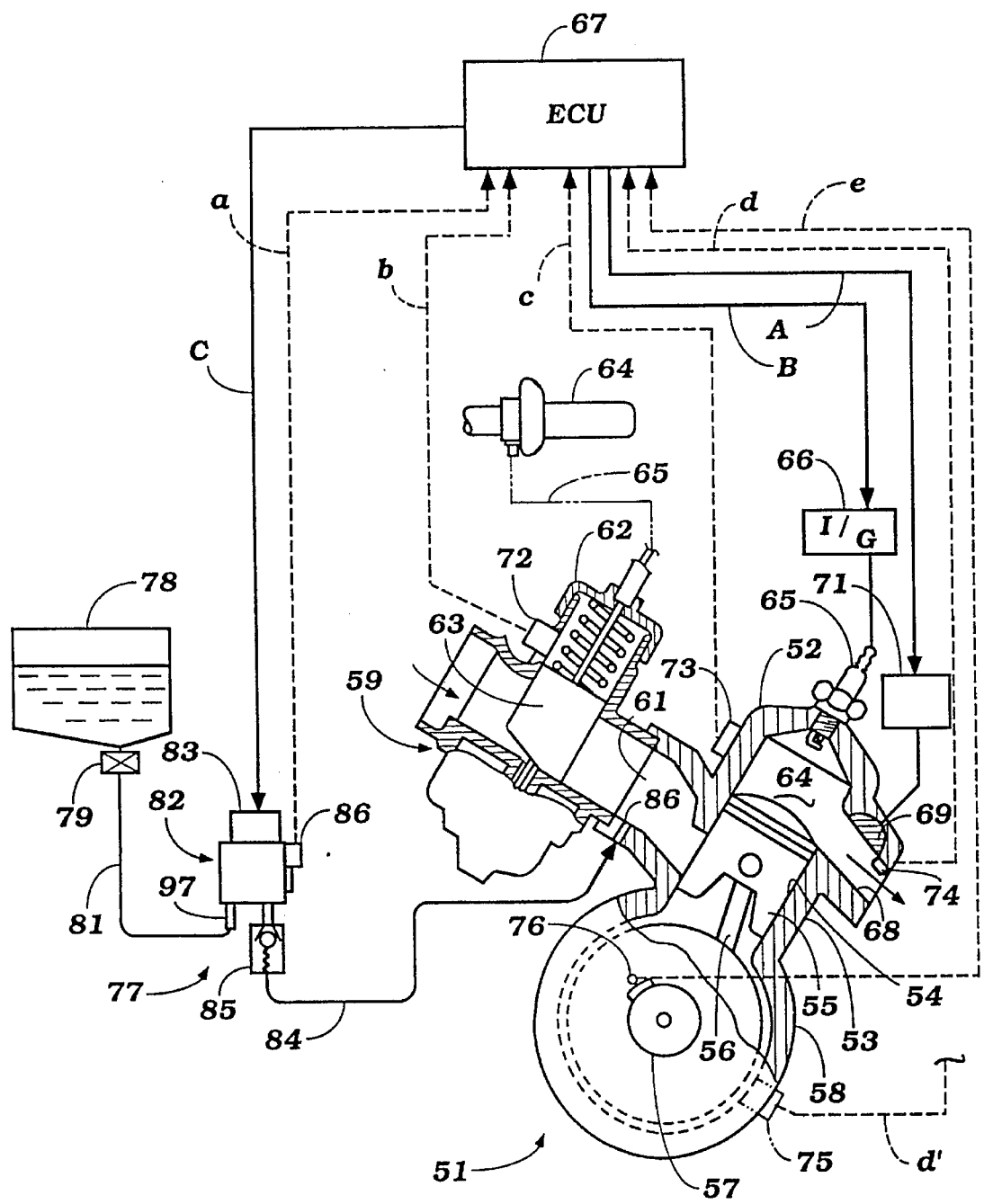
FIG. 1 is a side elevational view, with portions broken away and other portions shown schematically of an engine having a lubricating system constructed in accordance with an embodiment of the invention.

Referring now in detail to the drawings and initially to FIG. 1, a reciprocating machine and specifically a two-cycle crankcase compression internal combustion engine lubricated in accordance with an embodiment of the invention is illustrated and is identified generally by the reference numeral 51. It is to be understood that the construction of the machine (engine) 51 is to be considered typical of the type of mechanism that can be lubricated in accordance with a system embodying the invention. The engine as will be described may be considered to be conventional and for that reason only the details of the construction of the engine necessary to understand the construction and operation of the lubrication system will be described. Where any components are not described, they may be considered to be conventional. In a like manner, it will be obvious to those skilled in the art how the invention can be employed in conjunction with engines of types other than that illustrated and also with other types of machines.

The engine 51 is depicted through a cross section of a single cylinder because it will be readily apparent to those skilled in the art how the invention may be practiced with engines having multiple cylinders and other cylinder configurations. The engine 51 includes a cylinder block cylinder head assembly 52 having a cylinder block portion 53 that forms a cylinder bore 54. A piston 55 is supported for reciprocation within the cylinder bore 54 and is connected by means of a connecting rod 56 in a known manner to a crankshaft 57. The crankshaft 57 is rotatably journaled within a crankcase chamber formed by the cylinder block 53 and a crankcase 58 that is affixed thereto in a well known manner. As is typical with two-cycle crankcase compression engine practice, the crankcase chamber associated with each cylinder bore 54 (if a multiple cylinder engine is employed) is sealed from the others.

An intake charge is delivered to the crankcase chambers by an induction system, indicated generally by the reference numeral 59 and which includes an intake passage 61 formed in the cylinder block 53 and which communicates with the crankcase chamber through an intake port in a well known manner. A carburetor 62 is affixed to the cylinder block 53 and receives fuel from a fuel source (not shown) for forming a fuel air charge that is delivered to the crankcase chambers of the engine. The carburetor 62 in the illustrated embodiment is of the sliding piston throttle type and includes a piston type throttle valve 63 which is operated by a remote operator 64 through a bowden wire cable 65. The type of throttle control and carburetor 62 illustrated is a type normally employed in motorcycles or motorscooters and the throttle 64 is a handlebar-type twist grip throttle as is well known in that art. Obviously, other types of charge forming systems and controls therefore may be employed.

The fuel-air charge formed by the carburetor 62 is drawn into the crankcase chambers when the piston 55 moves upwardly in the cylinder bore. As the piston 55 moves downwardly this charge will be compressed and then is transferred to a combustion chamber 64 formed by the head of the piston 55, the cylinder bore 54 and the cylinder head cylinder block assembly 52. A sparkplug 65 is mounted in the cylinder head portion of the cylinder head cylinder block for firing this charge. The sparkplug 65 is fired by an ignition circuit 66 which is, in turn, controlled by an ECU 67 in a manner which will be described. The ECU 67 receives certain signals from the engine and its auxiliaries and also ambient signals, if desired, and outputs control signals, as will also be described later.

The burnt charge is discharged from the combustion chamber 64 through an exhaust passage 68 formed in the cylinder block 52 and which communicates with an exhaust manifold (not shown) for silencing and discharge of the exhaust gases to the atmosphere.

An exhaust control valve 69 is positioned in the exhaust passage 68 and is controlled by a servomotor 71 so as to adjust the compression ratio of the engine in response to sensed parameters. The servomotor 71 is also controlled by the ECU 67. The control signals A and B from the ECU 67 control the exhaust control valve 71 and ignition circuit 66, respectively, by any known control strategy.

As has been noted, the ECU 67 receives certain signals indicative of engine condition and these may include an engine load signal b which is derived in the specific embodiment illustrated by a throttle position Bensor 72 that cooperates with the throttle valve 63 of the carburetor 62 so as to output a signal indicative of the operator demand as determined by the position of the throttle valve 63. In addition, an engine temperature signal c is derived from an engine temperature sensor 73 that is mounted suitably on the engine, for example the cylinder block or cylinder head assembly 52. If the engine 51 is water cooled, this signal may be derived from a sensor in the cooling jacket of the engine.

An engine air flow signal d is provided in this embodiment by an exhaust pressure sensor 74 positioned in the exhaust passage 58. Alternatively, a crankcase pressure sensor 75 may output a crankcase pressure signal d' which will also be indicative of engine air flow.

A crankshaft position sensor 76 mounted on the crankcase 58 and cooperating with the crankshaft 57 in a known manner outputs a signal e which, when counted and divided by time will provide an indication of the rotational speed of the crankshaft 57. In addition to these sensors, various other sensors may be employed for the control of the ignition circuit 66 and the exhaust control valve 71 including ambient condition sensors. Again, this portion of the construction of the engine 51 may be considered to be conventional and, for that reason, further details of the control strategy for the various basic components of the engine is not believed necessary to understand and practice the invention.

In accordance with the invention the engine 51 is provided with a lubricating system, which is indicated generally by the reference numeral 77. This lubricating system 77 includes a lubricant tank 78 that is charged with lubricant and which supplies the lubricant through the filter 79 to a conduit 81 which, in turn, supplies this lubricant to a combined lubricant pump and distributor 82 having a construction which will be described in more detail by reference to FIGS. 2–6. This lubricant pump and distributor 82 is driven by a stepping motor, indicated by the reference numeral 83 and operates through a number of steps each of which effects less than the total stroke of the pump 82, as will be described. Once the requisite number of steps are completed, lubricant will be discharged in a finite quantity from the pump and distributor 82 to a supply conduit 84 in which a check valve 85 is positioned.

In this embodiment, the supply conduit 84 cooperates with a lubricant delivery port 86 that is disposed in the cylinder block intake passage 61. It is to be understood that lubricant may be delivered to the engine in other places than through its induction system or in addition to that. For example, lubricant may be supplied directly to the piston 55 through the cylinder block 53 and directly to other components of the engine. The specific way in which the lubricant is actually introduced to the engine is not a critical feature of the invention since the invention resides in the way in which the amount of lubricant supplies is measured and how it is delivered rather than where it is delivered to the engine.

The stepping motor 83 is controlled by a control signal C from the ECU 67. In addition, there is a position sensor 86 carried by the lubricant pump and distributor 82 for outputting a signal a when the pump is in a predetermined position, as will become apparent.

The construction of the lubricating pump and distributor 82 will now be described by particular reference to FIGS. 2–6, It will be seen that the assembly includes a main outer housing piece 87 that defines an internal cavity 88 which is closed at its lower end by an integral wall and at its upper end by means of a cover piece 89. The cover piece 89 is affixed to the main body portion 87 by a plurality of threaded fasteners 91 and an o-ring seal 92 provides a seal for the upper end of the cavity 88.

A combined cylinder support and cam forming member 93 is positioned in the lower end of the cavity 88 is held in place by means of threaded fasteners 94 (FIG. 6), This cylinder support and cam forming member 93 is provided with a pair of circumferentially spaced cutouts 95 one of which communicates with a flow passage 96 of a delivery inlet nipple 97 formed at the bottom of the housing piece 88 and which communicates with the conduit 81 for delivery of lubricant to the cavity 88 from the reservoir 78, A cross drilled passageway 98 extends through the cylinder support and cam forming member 93 so as to introduce lubricant to the actual pumping device of the pump and distributor mechanism 82 in a manner which be described.

The member 93 is provided with a cylindrical bore 99 in which a distributor sleeve and cylinder forming member 101 is supported for rotation. The sleeve 101 has an internal bore 102, the lower end of which is closed by means of a closure plug 103 which is stepped so as to provide a seal with the lower end of the sleeve 101. A pumping plunger 104 is slidably supported within the bore 102 and forms with the bore 102 and the closure plug 103 a pumping chamber 105. The sleeve 101 is formed with a distributor port 106 that is axially aligned with the cross bore 98 in the member 93 so as to selectively permit lubricant to flow from the chamber 88 into the pumping chamber 105 at the specific angular positions determined by the locations of the cross bore 98.

In the illustrated embodiment, the pump 82 provides two pumping cycles per rotation or one each 180° of rotation, as will become apparent. This is determined by the location of the cross bore 98 and a delivery cross bore 107 (FIG. 3) formed in the housing piece 93 which is spaced 180° from the cross bore 98. The delivery cross bore 107 is sequentially indexed with the sleeve timing port 106 so as to sequentially communicate fluid pressure to a pair of outlet nipples 108 and 109 formed in the lower end of the housing member 87. The outlet nipples 108 and 109 communicate with the check valve 85 or with a separate check valve for each nipple, depending upon whether the lubricant all is delivered at a common place to the engine or at spaced locations.

The stepper motor 83 has an output shaft 111 which is driven each time an electrical pulse is transmitted to the stepper motor 83 from the ECU 67 through a predetermined degree of angular rotation (450 in the illustrated embodiment). The speed of rotation will be determined by the width of the drive pulse applied to the stepper motor 83. If the drive pulse signal is wide then the speed of rotation will increase while if the width of the drive pulse is narrow, the speed will decrease.

A drive cup 112 is affixed by a keyed or splined connection to the stepper motor shaft 111 and has a pair of opposed slots 113 that establishes a driving connection to a drive pin 114. The drive pin 114 extends through a bore formed in the upper end of the plunger 104 so as to provide a driving connection between the drive cup 112 and the pumping plunger 104. This driving connection causes the pumping plunger 104 to rotate as the drive cup 112 rotates but also permits axial movement of the pumping plunger 104 relative to the drive cup 112 and the cylinder sleeve 101. The cylinder sleeve 101 is also rotatably coupled to the drive pin 114 by a slot 115 as formed in the cylinder 101 for this purpose. The slot 115 has sufficient length, however, so as to permit reciprocation of the pin 114, in a manner to be described, without corresponding reciprocation of the distributor sleeve 101.

A first coil compression spring 116 engages the end of the drive cup 112 and the distributor sleeve 101 for urging the distributor sleeve into sealing engagement with the end plug 103. A second coil compression spring 117 engages the drive cup 112 and the pump plunger 104 SD as to urge the pump plunger into engagement with a pair of drive cams 118 formed on the support and cam forming member 93. These drive cams 118 and their relationship with the drive pin 114 may be understood by the developed view of FIG. 7. It will be seen that the drive cam 118 is provided with a pair of circumferentially spaced notches 119. When the drive pin 113 has been rotated to register with these notches 119 the pump plunger 104 will be driven downwardly by the spring 117 to reduce the volume in the pumping chamber 105 and pressurize the lubricant. On the other hand, when the rotation continues so as to cause the drive pin 114 to move upwardly into engagement with the upper cam surface 118, the pump plunger 104 will be urged upwardly compressing the spring 117 and increasing the volume of the pumping chamber to 105. As will be discussed, this permits fluid to be drawn into and discharged under pressure from the pumping chamber 105.

Figure 2:
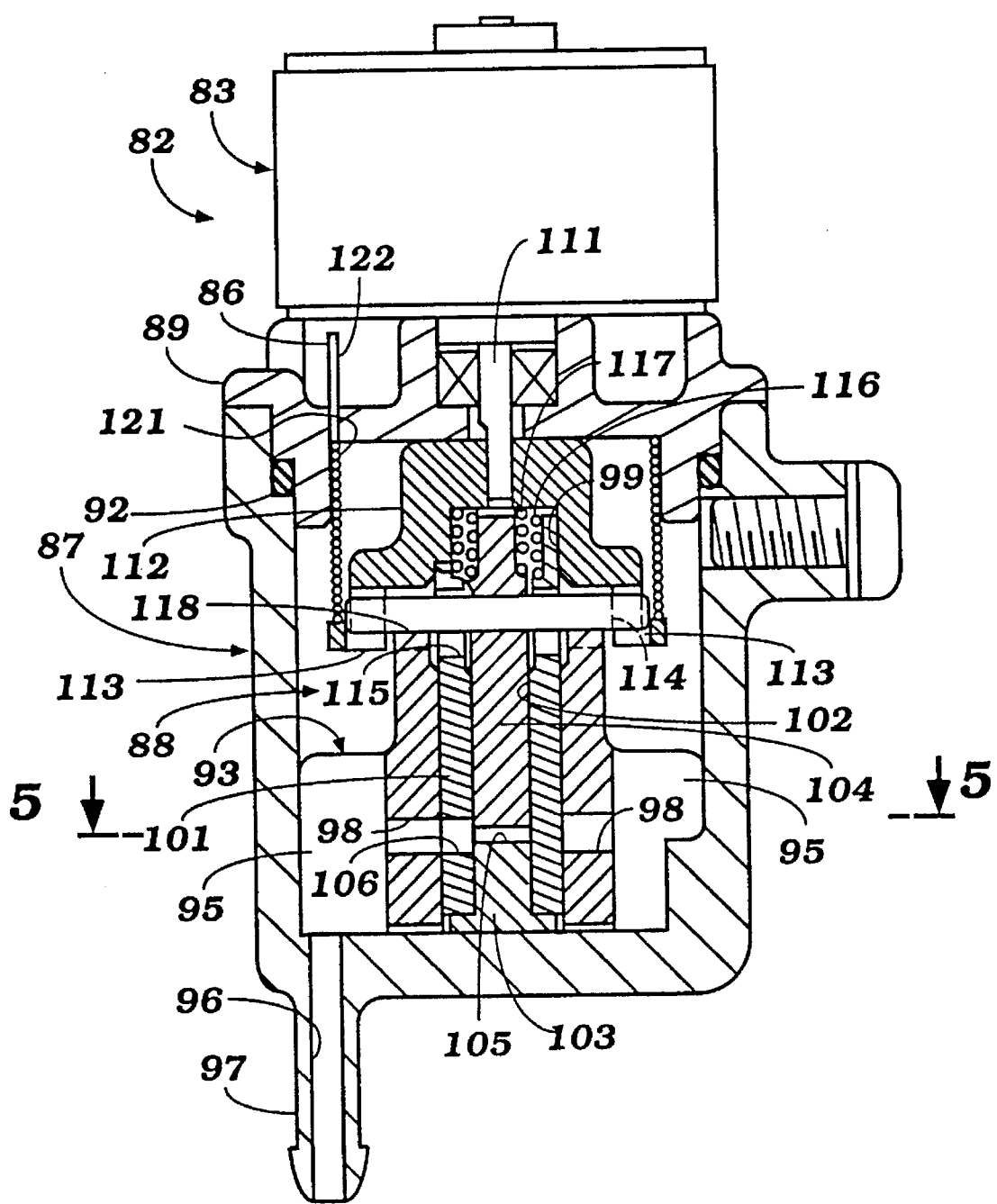
FIG. 2 is an enlarged cross-sectional view taken through the lubricant pump and distribution device.
Figure 3:
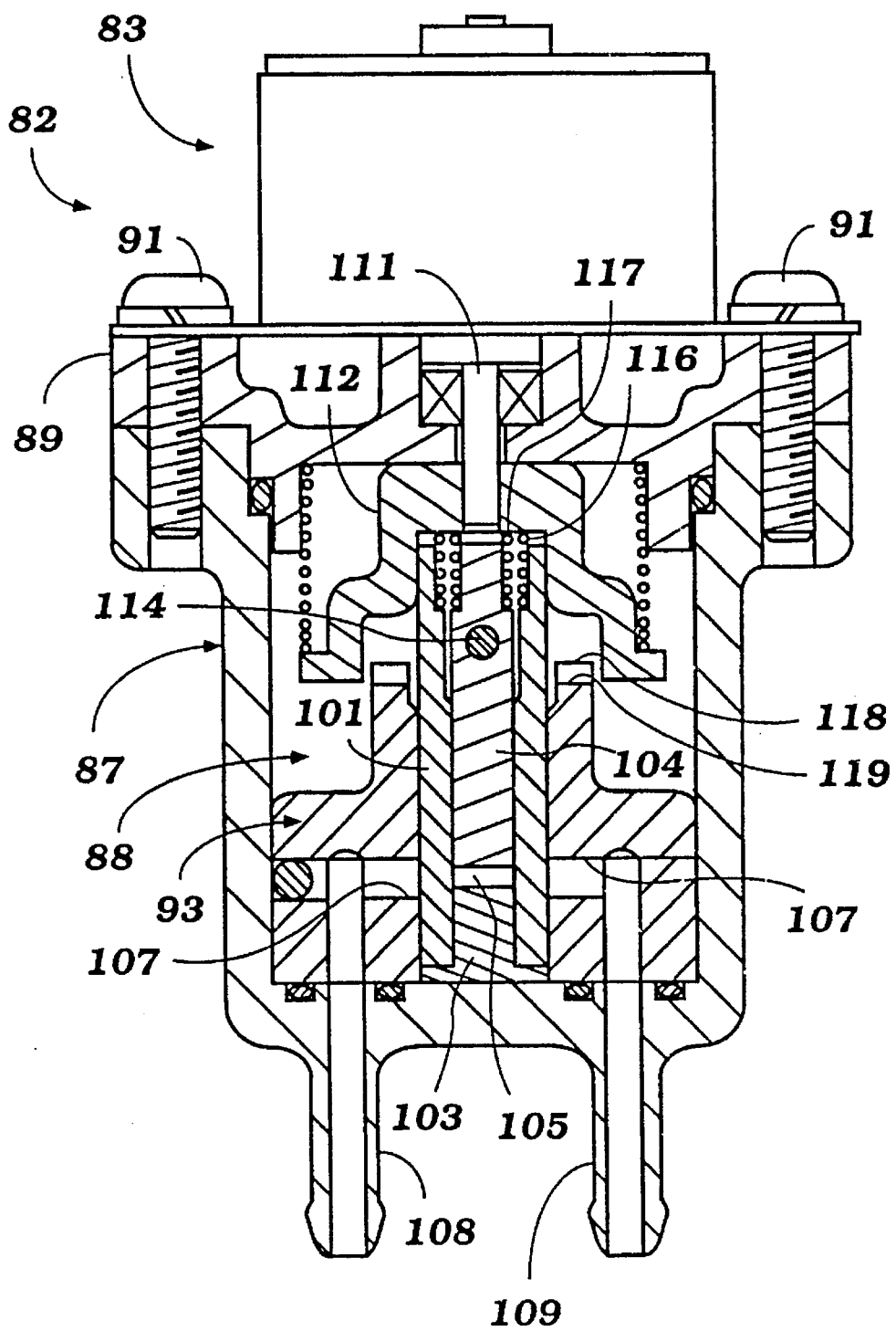
FIG. 3 is a cross-sectional view of the lubricant pump and distribution device taken along a plane perpendicular to the plane of FIG. 2.
Figure 4:
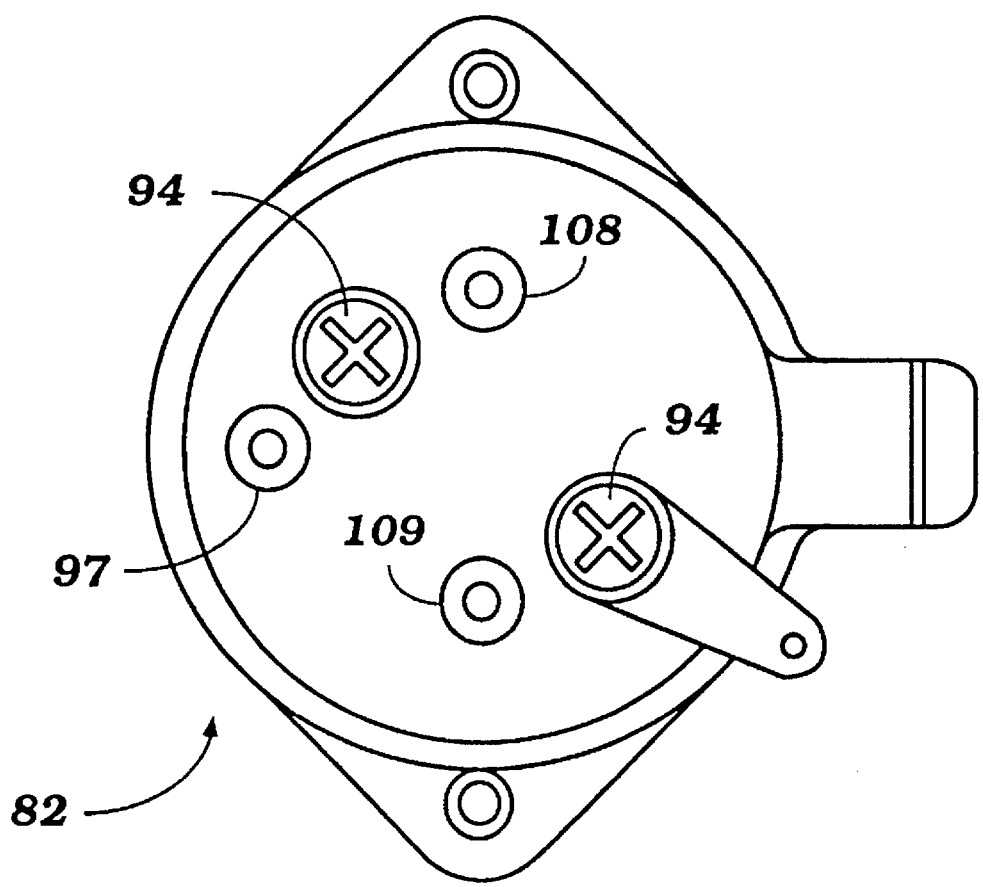
FIG. 4 is a bottom plan view of the lubricant pump and distribution device.

The position sensor 86 which is illustrated schematically in FIG. 1 is shown in more detail in FIGS. 2 and 3 and provides an output signal each time the drive pin 114 and pumping plunger 104 is at its extreme upward position and the end of the suction stroke of the pump 82. This sensor includes a coil winding 121 that is connected to a terminal 122 so as to output the signal when the drive pin 114 is brought into registry with the winding or coil 121 at the upper portion of its strobe as shown in FIG. 2. Hence, in the illustrated embodiment, there will be two such indications each complete revolution of the stepper motor 83 or one each 180° of rotation. As will become, apparent, the number of steps of the stepping motor necessary to achieve a pumping cycle can be varied.

Figure 5:
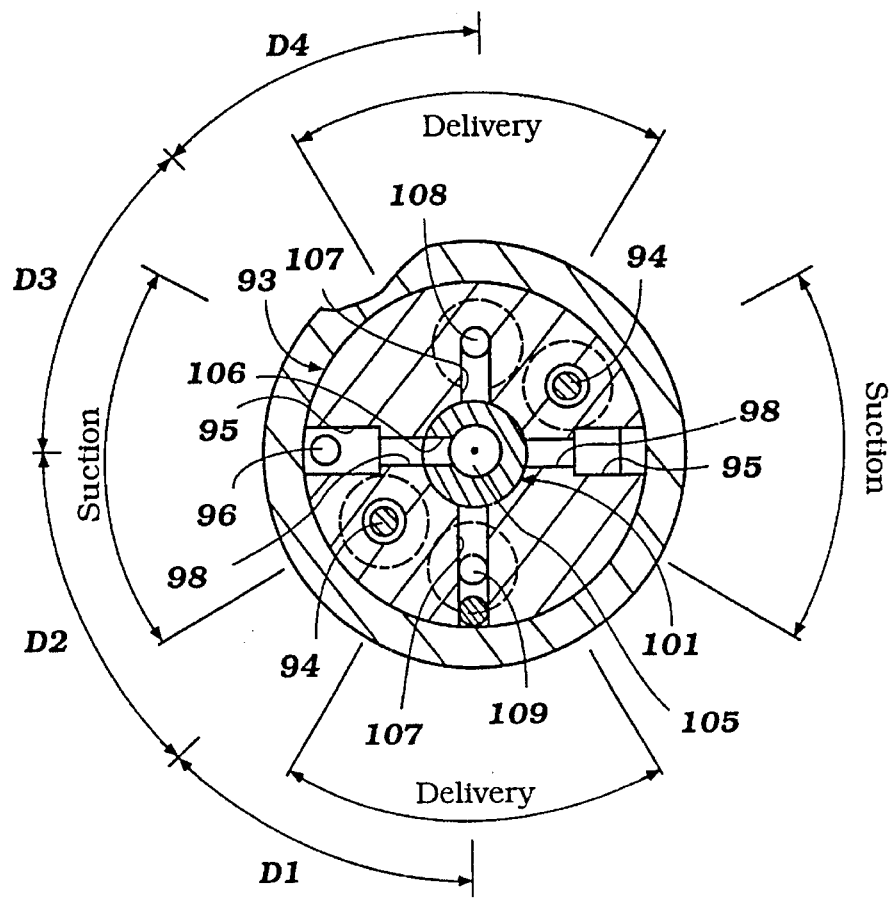
FIG. 5 is a cross-sectional view taken along the line 5—5 of FIG. 2.
Figure 6:
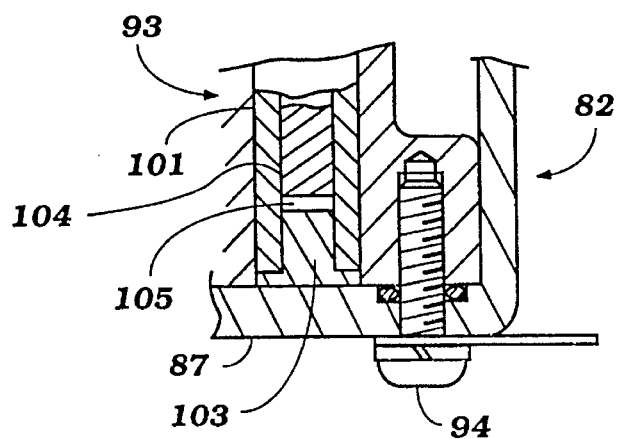
FIG. 6 is a partial cross-sectional view of another portion of the lubricant pump and distribution device.

A sequence of pumping operation of the pump 82 will now be described by particular reference to FIGS. 5 and 7. Actually, FIG. 5 shows the condition after the drive cup 112 and stepper motor output shaft 111 have rotated through 90° from the start position, indicated at the beginning of the dimension D1. At the D1 position, the distributor port 106 of the distributor sleeve 101 will be in registry with the discharge passageway 107 that communicates with the discharge nipple 109 and lubricant will be delivered at this point. Actually, the lubricant delivery will have begun earlier, as shown by the arrows in FIG. 5 due to the fact that the distributor port 106 comes into registry with the passageway 107 before the D1 position. Upon the transmission of a driving impulse to the stepper motor 83, the stepper motor shaft 111, drive cup 112 and drive pin 114 will be rotated through 45° to the termination of the D3 position. During this time, the drive pin 114 will engage an incline surface 123 at the side of the flat 118 and be driven upwardly to the upper cam surface 118 as shown at the D1 position in FIG. 7. When this occurs, the distributor port 106 will be moved out of registry with the passages 98 and 107 but the plunger 104 will be moving upwardly to create a reduced pressure in the pumping chamber 105.

Upon the next impulse of driving force to the stepper motor 83 rotation through the dimension D2 will occur and at a position somewhat before the actual completion of the movement to the D2 position the distributor port 106 will come in registry with the cross drilling 98 and lubricant can flow from the chamber 88 into the pumping chamber 105 because of the reduced volume occurring therein. Thus, the chamber 105 will be filled with liquid lubricant.

During the next impulse of driving through the range D3, the fluid will continue to fill the chamber until the delivery port 106 is no longer in contact with the cross drilling 98 and the lubricant will remain in the chamber 105.

During the final drive cycle D4, the pin 114 will come in registry with a ramp 124, leading to the flat 119, and the coil spring 117 will urge the pumping plunger 104 downwardly, and fluid will be compressed. Upon continued movement through the step D4, the distributor passageway 106 will come into registry with the cross-drilling 167 at the beginning of the delivery phase, and lubricant will then be delivered out of the discharge nipple 108. Hence, it should be apparent that a finite amount of lubricant is pumped, the volume of the chamber 105 from maximum volume condition to minimum volume condition during each 180 degrees of rotation of the stepper motor shaft 111. As previously noted, other timing intervals can be employed.

Because of the relatively small amount of liquid displaced during each pumping cycle, pumping losses due to internal leakage will be held constant for each pumping cycle, and thus no adjustments are required or compensation for the pumping losses, since they are known each cycle and do not differ from each other. Also, due to the fact that relatively small amounts of lubricant are delivered each cycle, the control is much more accurate than with previously described constructions.

Figure 8:
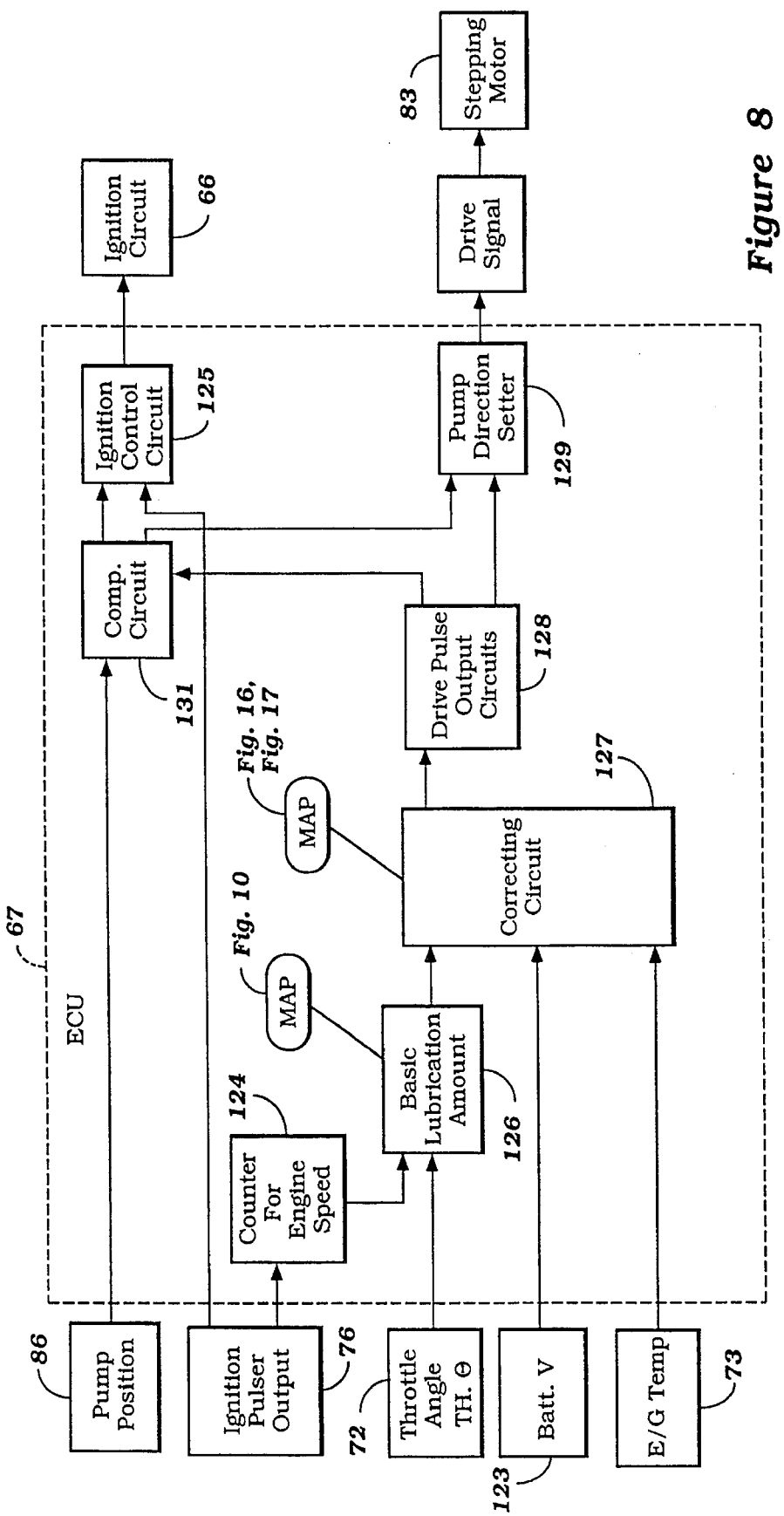
FIG. 8 is a block diagram showing the components of the lubricant control and related sensors.

Having thus described the hardware of the system, the actual control strategy will be described now by reference to FIGS. 8–17 and initially to FIG. 8, which shows the interrelationship of the components in block form. As has already been noted, the ECU 67 receives certain signals from the engine sensors, and some of these signals are also employed in the lubricant control, as seen in FIG. 8. These include the position of the throttle valve 63, as determined by the throttle position sensor 72, and the output of the crankcase rotation sensor 76, which indicates each revolution of the engine. Engine temperature from the engine temperature sensor 73 is also supplied to the ECU 67 for lubricant control. In addition to these sensors, the output of the pump position sensor 86 and the voltage of the battery of the system, indicated by a battery voltage sensor 123, are input to the ECU 67. The output from the pulsar coil 76 or crankcase position sensor is transmitted to an internal counter 124 of the ECU 67, which provides a number of counts of the pulse in a given time period so as to determine engine speed. It should be noted that in the particular lubrication system disclosed, the measured engine parameters are engine speed and engine load, as determined by throttle position from the throttle position sensor 72. Although these particular parameters are used, it will be readily apparent to those skilled in the art how other parameters can be employed.

In addition, the output from the crankshaft position sensor 76 is also transmitted to an ignition control circuit 125 of the ECU, so as to output the control to the ignition circuit 66 for its operation. As previously noted, this can be done in accordance with any desired strategy.

Figure 9:
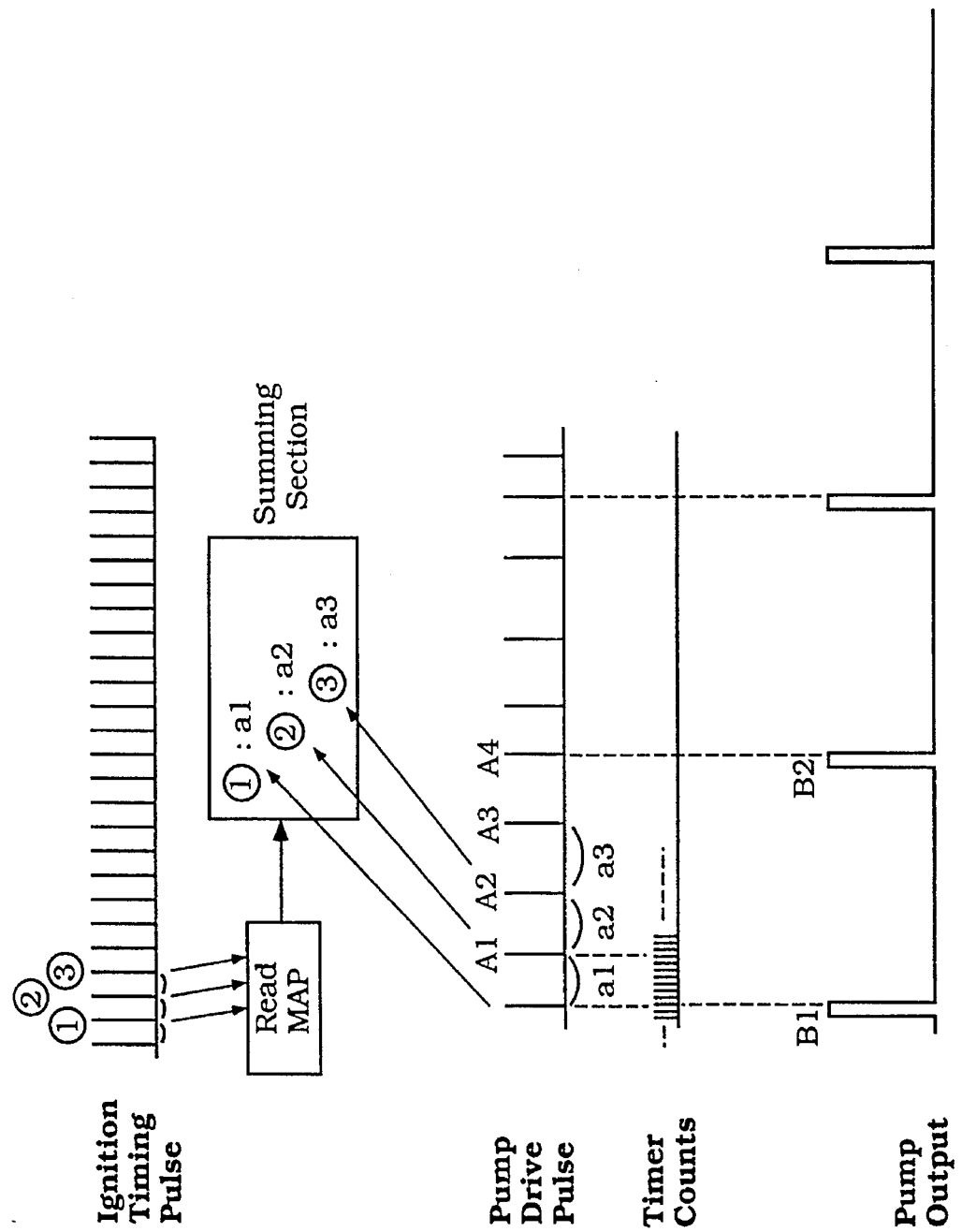
FIG. 9 is a graphical view showing the ignition pulses, lubricant pump driving pulses and lubricant delivery cycles in relation to time.
Figure 10:
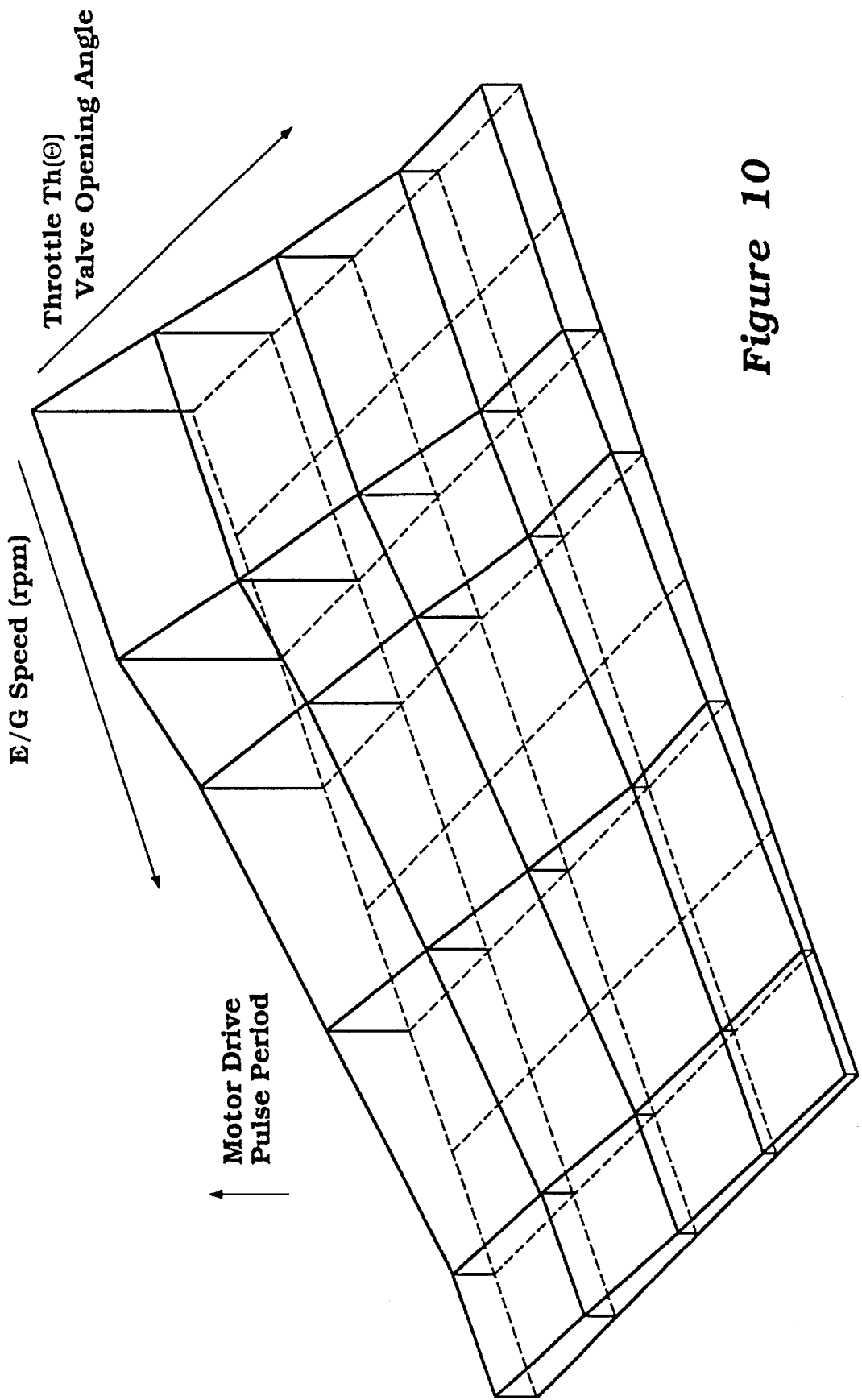
FIG. 10 is a three-dimensional map showing how the pump drive pulse driving interval is determined in relation to lubricant consumption at various engine speeds and throttle openings or loads.

The output from the engine speed counter 124 and the output from the throttle angle sensor 72 are transmitted to a basic lubrication amount determining circuit 126 of the ECU 67, which determines the basic amount of lubricant required for the instantaneous engine running conditions, as determined by a three-dimensional map, as shown in FIG. 10. As seen in FIG. 9, each time the pulsar 76 outputs a pulse, there is a signal transmitted to the ECU 67, which causes it to read the map of FIG. 10 and output this reading into a summing circuit, which will then determine a respective lubricant consumption value that are summed on each reading in a summing section, as shown in FIG. 9. This then determines the drive pulse periods when the actual pump driving pulses A1 are transmitted to the stepping motor 83. As has been previously described, each four driving pulses will cause a delivery output of the pump, as shown in FIG. 9, with the delivery pulses being indicated at B1, B2, etc.

Again referring to FIG. 8, the output signal from the basic lubrication amount circuit 126 is then output to a correcting circuit 127, which corrects the timing signal, dependent upon certain conditions; in this specific embodiment, the battery voltage determined by the sensor 123 and the engine temperature determined by the sensor 73. These adjustments, or compensation factors, are made in accordance with the maps of FIGS. 16 and 17, as will be seen. As the engine temperature increases, the drive pulse period is done more frequently so as to ensure adequate lubrication as the heat load increases. On the other hand, if battery voltage increases, the pump driving pulse can be shortened so as to alleviate load on the battery and reduce heat generated by the stepping motor 83. That is, the high battery voltage indicates that the system can operate at a minimum duration of driving pulse; whereas if the battery voltage is down, then a longer driving pulse is required.

Once the correction is made, the corrected signal is transmitted to a drive pulse output circuit 128 of the ECU, which outputs its drive signals to a pump direction setter, indicated generally by the reference numeral 129. As will be noted later in this description, if there is determined a lack of coincidence between the actual position of the pump plunger 104 and the desired or expected position, then it is determined that there is some blockage in the system, and the direction of pump rotation is reversed. The signal is then output to a drive signal, which is in turn transmitted to the stepping motor 83 for its operation through a single drive step.

Still referring to FIG. 8 and as has been noted, the system compares the actual position of the pump plunger 104 with the position that it should have assumed for the number of drive pulses generated. Thus, the output from the pump position sensor 86 and the output from the drive pulse circuit 128 are delivered to a comparator circuit 131 of the ECU 67, which will compare the signals, as will be described later, so that when four drive signals have been generated, this will be compared with the actual position as determined by the pump position sensor 86; and if the desired position is not existent, then the corrective action will be initiated by the pump direction setter 129, which receives the output signal from the comparator circuit 131. In addition, if there is a discrepancy and this is not cured, then the engine speed will be reduced by the comparator 131, outputting an appropriate signal to the ignition control circuit 125 to reduce the speed of the engine 51 by Skipping firings of the spark plugs 65 in any well-known manner.

Figure 11:
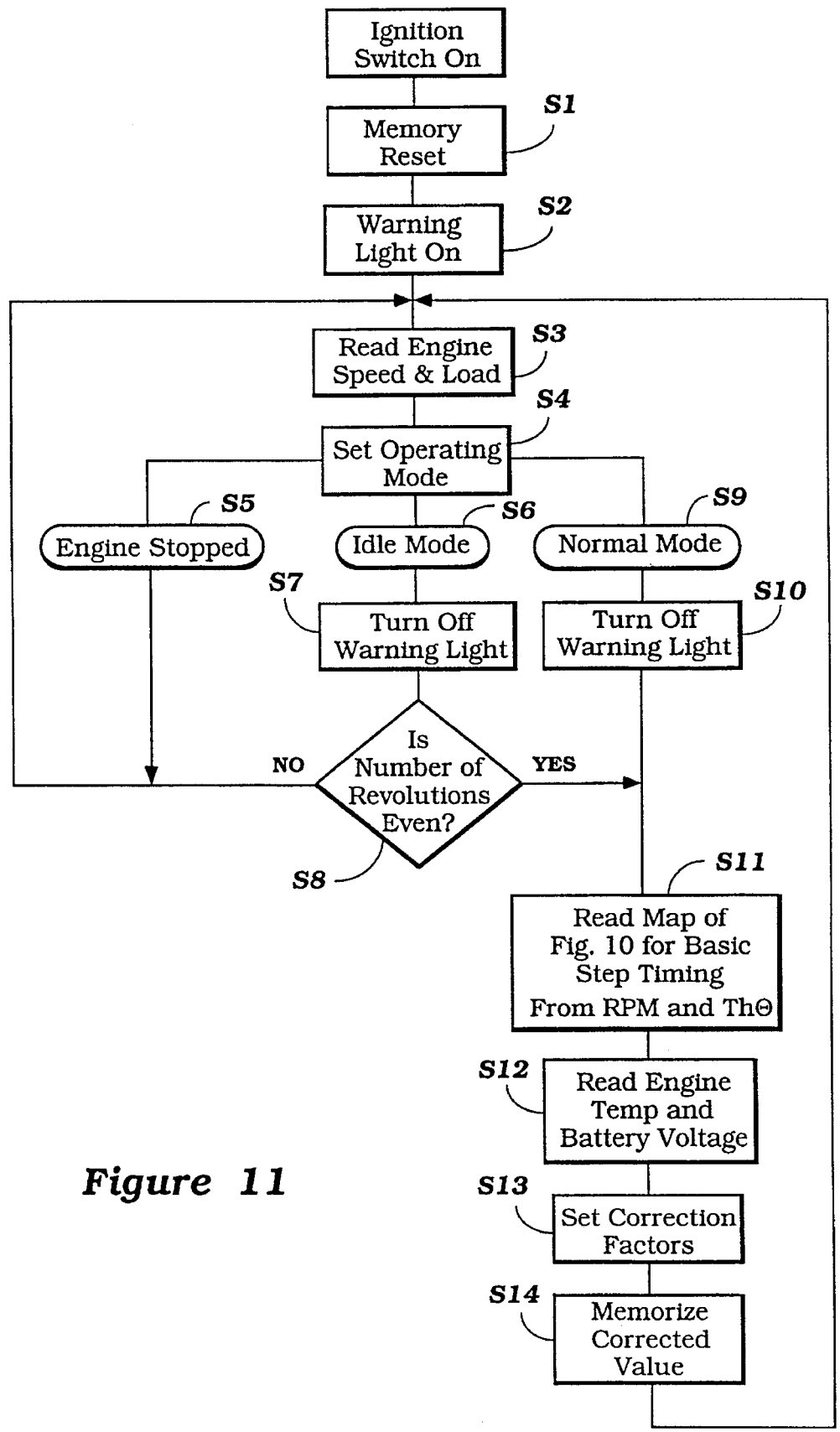
FIG. 11 is a block diagram showing the control routine for determining the requisite amount of lubricant and the pump driving time interval.

The actual control routine by which the lubrication stepping intervals are determined and initiated will now be described by initial reference to FIG. 11, and subsequently to FIGS. 12–15. FIGS. 16 and 17 will again be referred to inasmuch as they show the compensation maps.

The program begins when the ignition switch is turned on, and then at the step S1, the memory is reset. In addition, at the step S2 a warning light is turned on so as to permit the operator to determine that the warning light system is operative.

The program then moves to the step S3, so as to read the condition of the engine speed from the output of the sensor 76 from the speed calculator 124 of the ECU 67, and also throttle angle position from the throttle sensor 72 at the step S3. The program then moves to the step S4 so as to determine the operating mode required based upon the engine speed and engine load or throttle opening, as were read at the step S3.

If at the step S4 it is determined that the engine is not running because there is no output of engine speed, the program moves to the engine stop mode at step S5 and resets back to step S3.

If, however, at the step S4 it has been determined that the engine is running and the engine speed is at idle speed, the program moves to the idle mode of Step S6. The program then moves to the step S7 to turn off the warning light that was turned on at the step S2. Once the warning lights is turned off at the step S7, the program then moves to the step S8 so as to determine the number of revolutions that the engine has made from the outputs of the crankshaft sensor 76 and determine if the number is even or odd. If the number is odd, the program repeats back to the step S3. If, however, is even, then the program skips to the step S11. The reason for this is that calculations of the basic drive pulse period are performed every second revolution during idling. The reason is that the basic drive pulse period is calculated every two revolutions of the engine during idling and when there is low heat loading.

The manner in making the calculations from the steps S11–S14 will be described in conjunction with the description of the normal mode of operation.

If at the step S4 it is determined that the engine is running and operating at greater than normal idle speed, the program moves to the normal mode of operation at the step S9 from the step S4. The warning light is then turned off at the step S10, and the map of FIG. 10 is read from the engine speed and engine throttle position determined at the step S9 so as to determine the basic timing interval for the operation of the stepper motor 83 in accordance with a calculation that will be described later. This operation is performed in the section 126 of the ECU 67, as previously noted.

The program then moves to the step S12 so as to read the variables that may require correction of the basic lubrication pump drive interval, and in this embodiment these are engine temperature and battery voltage. As previously noted, this is done in the circuit 127 of the ECU 67 from the maps of FIGS. 16 and 17. As has been previously noted, if the battery voltage is low, the timing pulse intervals is increased to compensate for the low voltage. On the other hand, if the engine temperature is high, then the pulse intervals is shortened so as to provide more rapid response for the high-temperature conditions.

Figure 16:
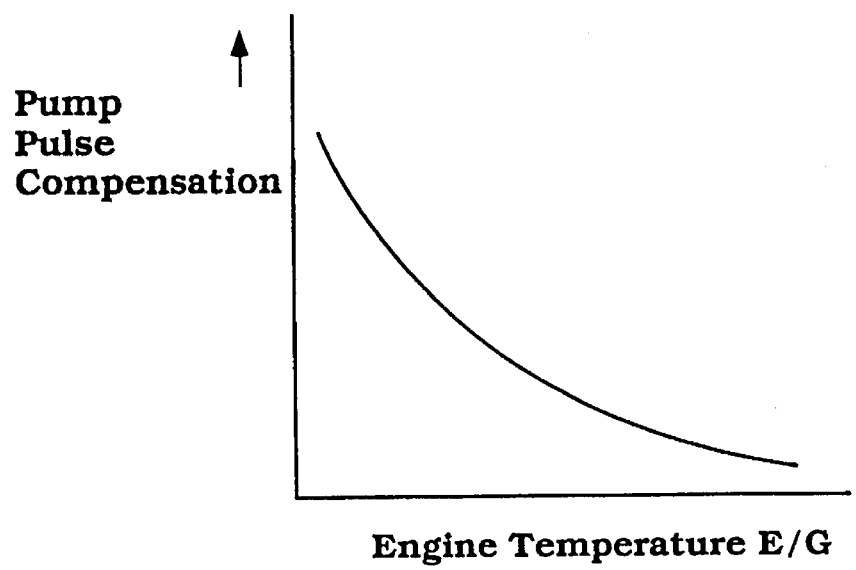
FIG. 16 is a graphical view showing the compensation of the drive pulse timing in relation to engine temperature.
Figure 17:
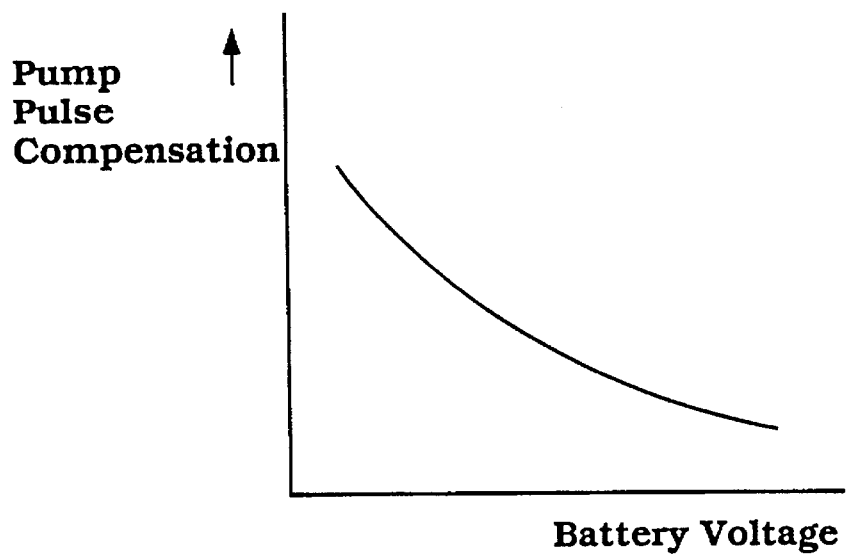
FIG. 17 is a graphical view showing the pulse timing compensation in relation to battery voltage.
Figure 18:
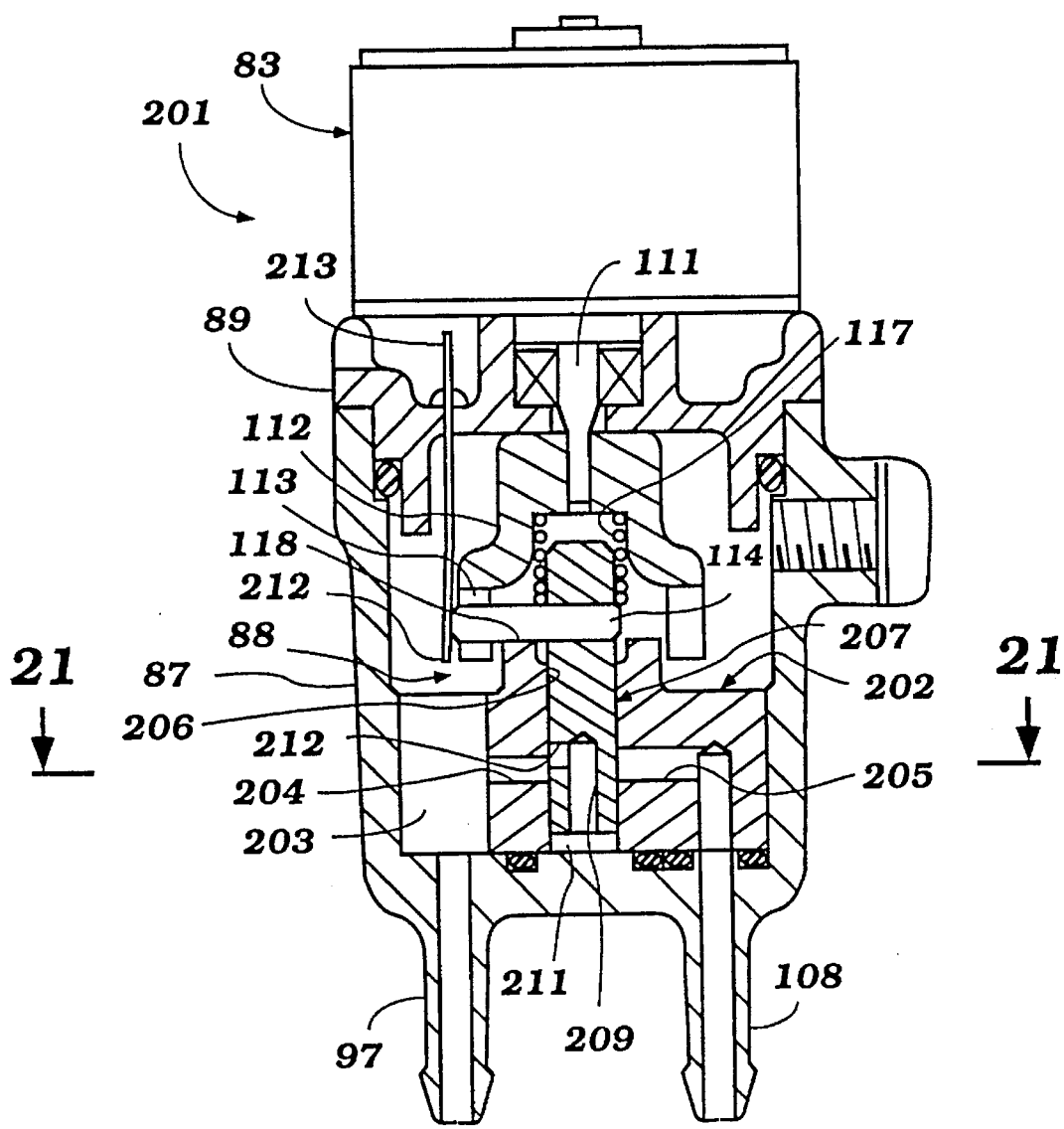
FIG. 18 is a cross-sectional view, in part similar to FIG. 2, of a lubricant pump constructed in accordance with another embodiment of-the invention.
Figure 19:
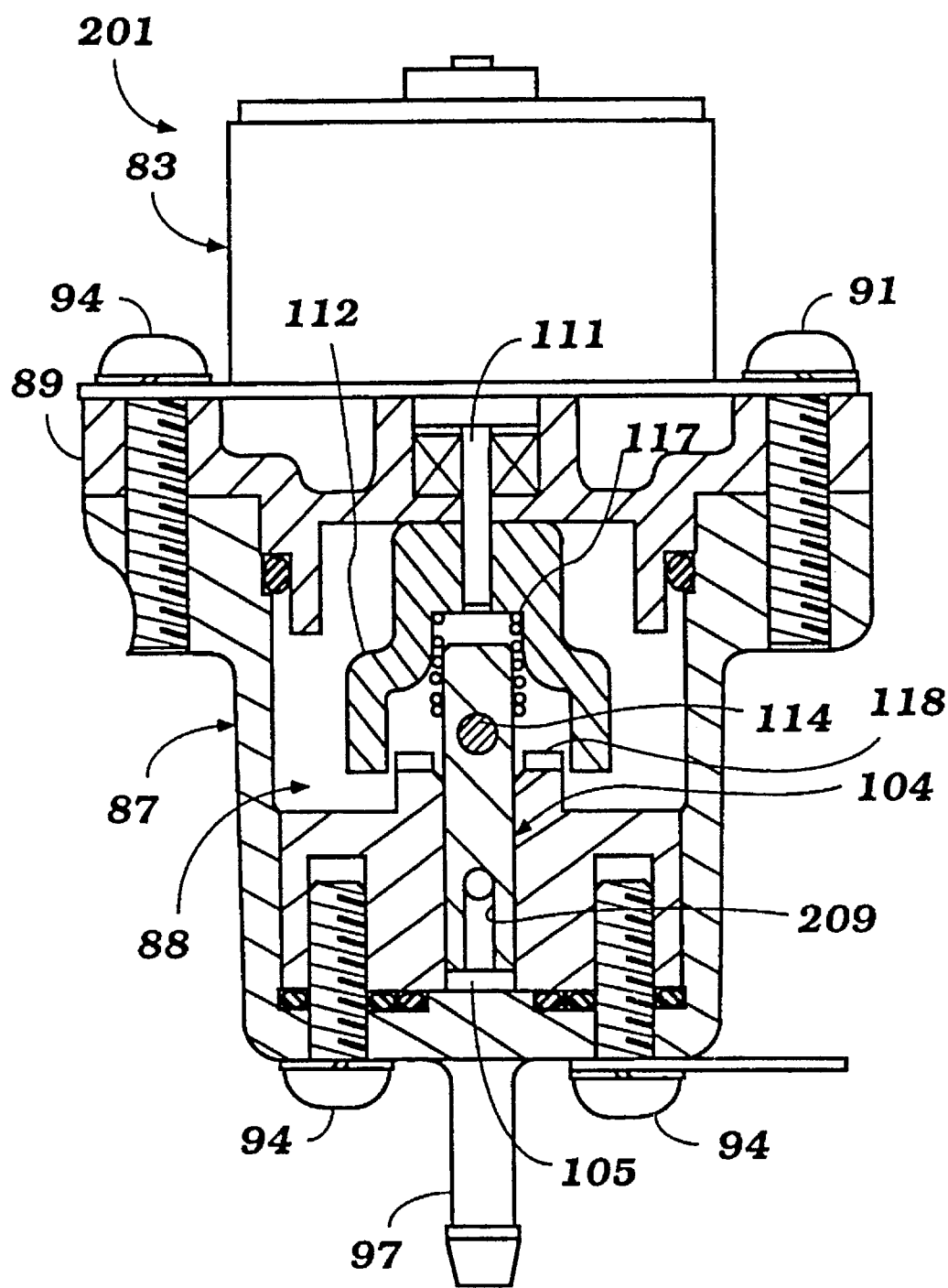
FIG. 19 is a cross-sectional view, in part similar to FIG. 3, showing the lubricant pump in accordance with the embodiment of FIG. 18.
Figure 20:
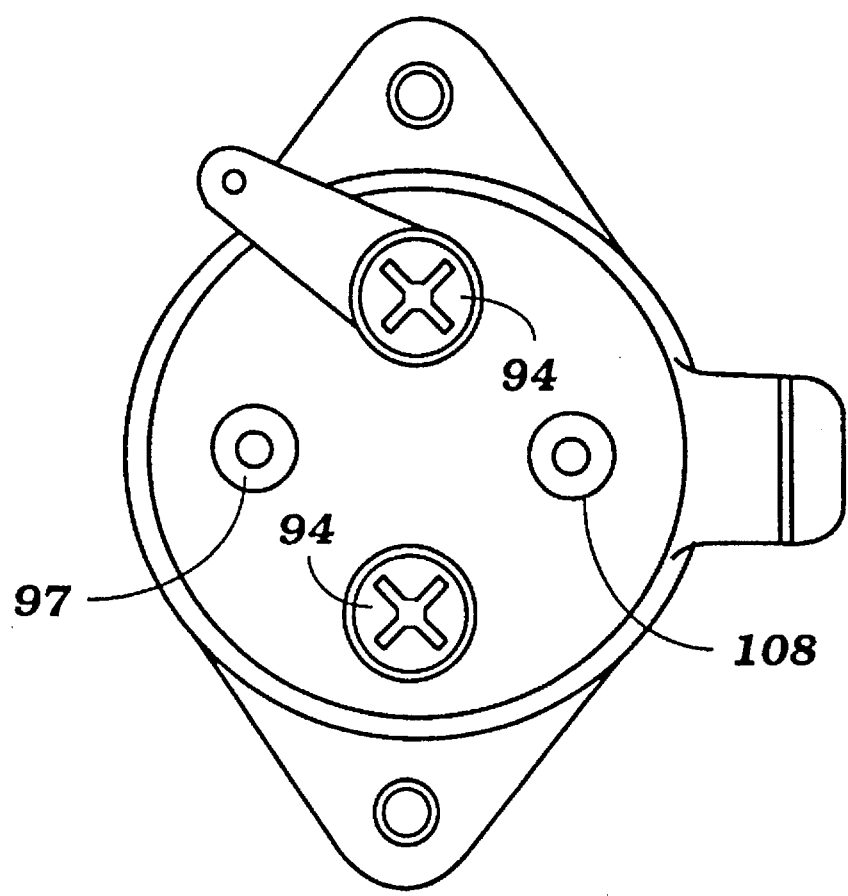
FIG. 20 is a bottom plan view of the lubricant pump of this embodiment.
Figure 21:
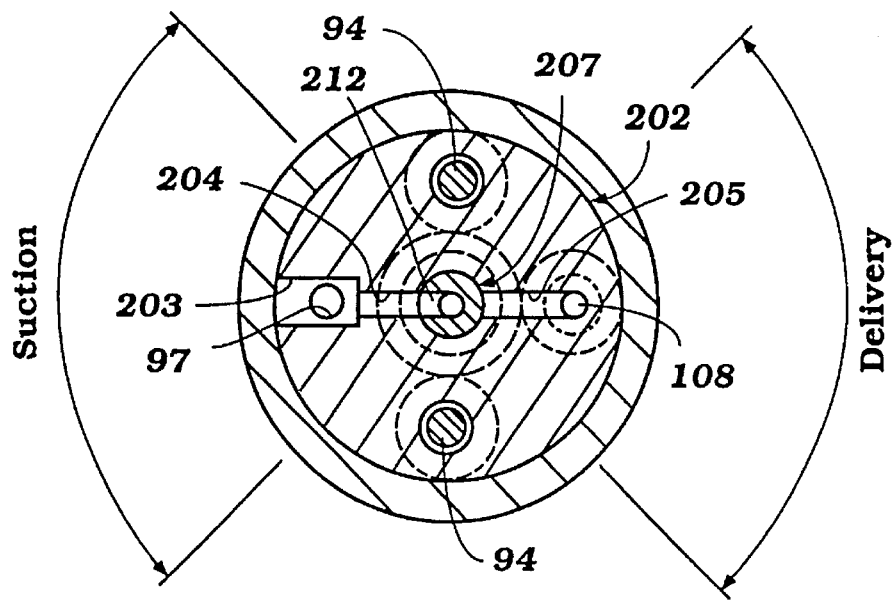
FIG. 21 is a cross-sectional view taken along the the 21—21 of FIG. 18.

The correction factors are set at the step S13 in accordance with data arrived at from the map of FIGS. 16 and 17, and this is performed within the section 127 of the ECU 67, as previously noted.

The program then moves to the step S14 so as to memorize the corrected value of the stepping timing.

Figure 12:
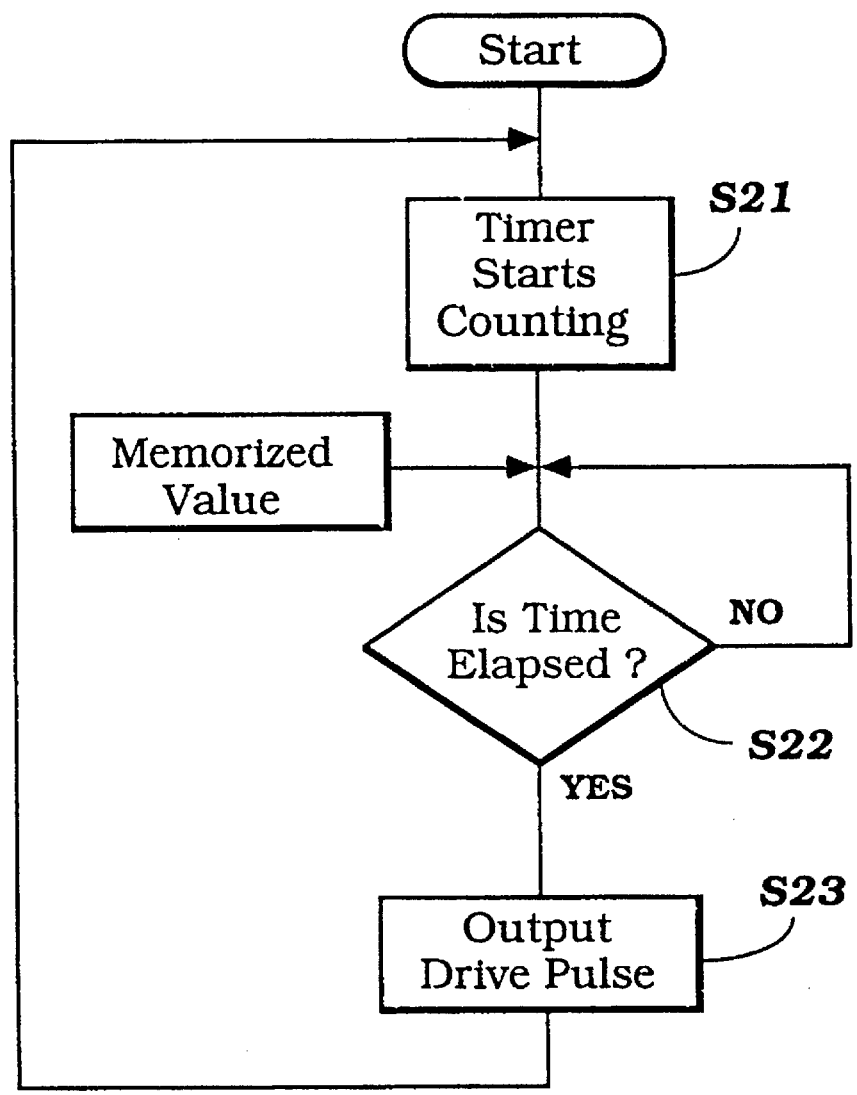
FIG. 12 is a block diagram of a control routine showing how the driving pulses are sent to the lubricant pump in response to the selected time interval.
Figure 13:
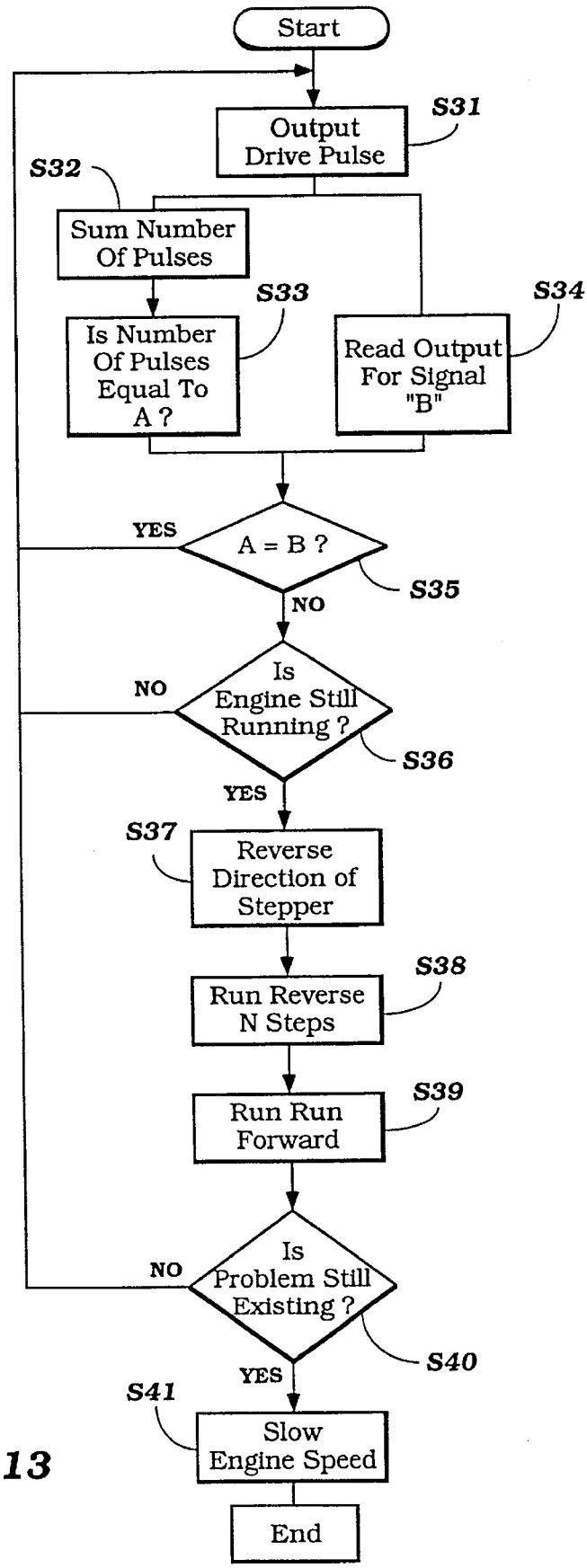
FIG. 13 is a block diagram showing the corrective action that is taken when the lubricant pump is determined to be out of phase.

FIG. 12 shows how the actual driving pulses are output. In this program the timer is started counting at the step S21, and at the step S22 the timer output pulses are compared with the memorized value from the step S14. If the time has not elapsed, the program repeats back to the step S22. If, however, at the step S22 the time has elapsed, then the program moves to the step S23 to actually output the drive pulse to the stepper motor 83.

In the described operation, the amount of lubricant supplied and the operation of the stepping motor 83 is done by an open-loop method. Because of this it may be desirable, as has been previously noted, to verify that the stepping motor is in time. That is, it is important to determine that the stepping motor effects a complete pumping cycle for each required number of steps, four pulses in the exemplary mode. As has been previously noted, the unit 131 of the ECU 67 makes a determination if this is the case, and the way this is done is shown in the block diagram of FIG. 13, which will now be described.

Once the program starts, it moves to the step S31 wherein the output drive pulse to the stepper motor 83 is transmitted. The program then moves to the step S32 so as to sum the number of the output drive pulses. The program then moves to the step S33 so as to determine if the summed number of the output drive pulses equals A, where A is the number of pulses needed for the stepper motor to complete a single pumping cycle (4 in the example).

Simultaneously, the output of the position sensor switch 86, which indicates the position B of the pump plunger 101 as having completed a single stroke, is monitored. At the S35, a comparison is made at the instant the number of pulses A has been reached to determine if there is a simultaneous reading of the output signal B. If so, this indicates that the pump plunger 104 is in phase and operating properly, and the program repeats back to the step S31.

If there is a discrepancy in the timing of the pump plunger 104, then the program moves to the step S36 to determine if the engine 51 is still running. If it is not, the program repeats.

If, however, at the step S36 it is determined that the engine is still running, then it is clear that some difficulty has occurred in the pump 82 to cause it to be out of phase. The program then moves to the step S37 so as to reverse the direction of rotation of the stepper motor. As has been previously noted, this is accomplished by the unit 129 of the ECU 67. This reverse operation is continued at the step S38 for a predetermined number of steps N, which may be the number required for a complete pumping cycle. The program then moves to the step S39 to cause the stepper motor to again be returned to rotate in the forward direction. The program then moves to the step S40 to determine if there is now correspondence in the position of the pump plunger. That is, it is determined if the problem is still existent. If it is not, the program returns back to the step S31.

If, however, at the step S40 it is determined that the pump plunger 104 is still out of synchronism, then it is realized that there may be a problem with adequate engine lubrication and the program moves to the step S41 to reduce the engine speed by affecting the ignition circuit 125 in the ECU 67, as previously noted. The program then ends.

In accordance with another feature of the invention, the pulse widths of the output pulses to effect stepping of the stepping motor 83 are varied in response to the position of the pump plunger 104, and specifically that of the delivery port 106 of the control sleeve 101. This is done so as to improve the performance of the pump, and this procedure is illustrated and will be described by reference to FIG. 15.

Figure 15:
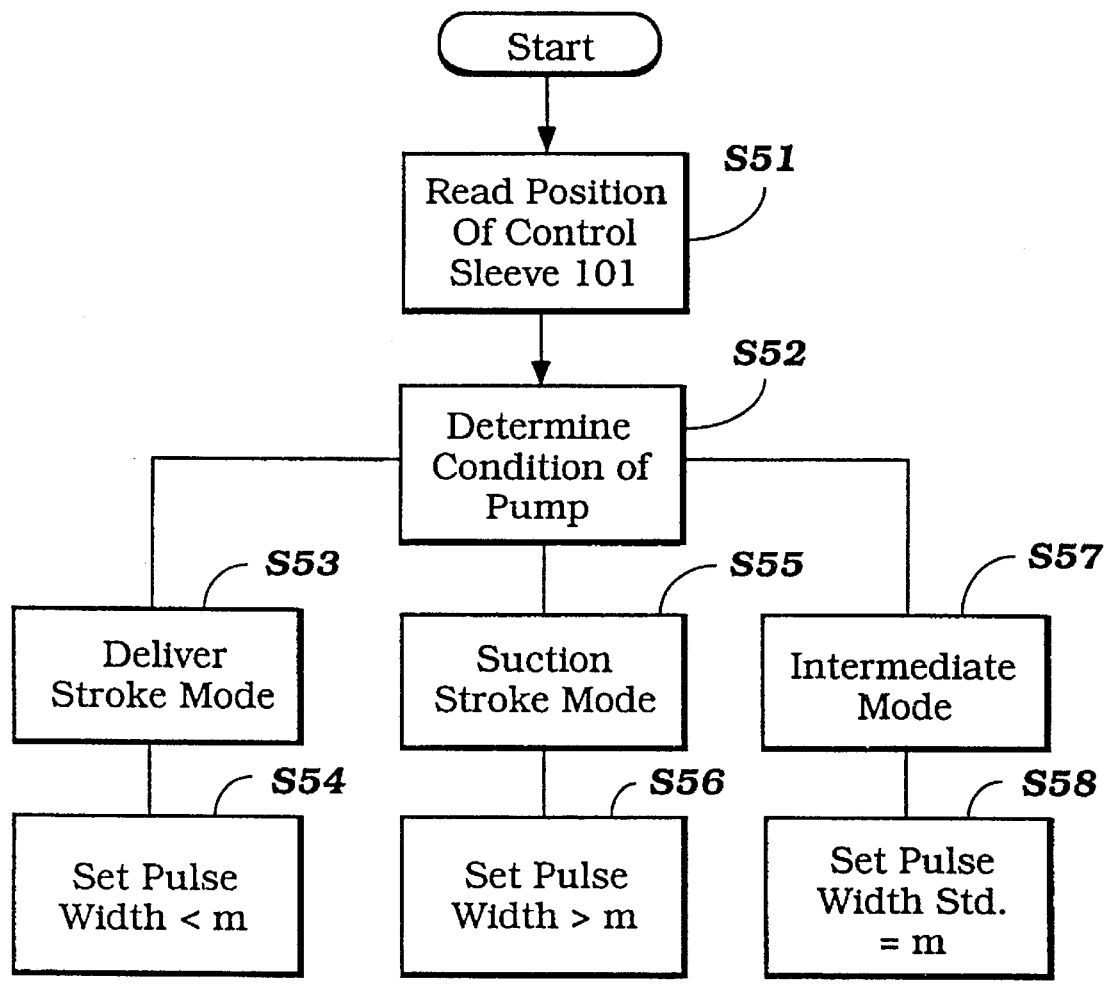
FIG. 15 is a block diagram showing the method of determining the pulse width in response to the engine operational speed in accordance with the embodiment of the invention.

In FIG. 15, a control routine for varying the pulse widths depending upon the angular position of the pump 82 begins at the step S51 to determine the angular position of the control sleeve. This is done to determine whether the pump is in a delivery or suction stroke, the respective angular positions of these phases being shown in FIGS. 5 and 7. The program then moves to the step S52 so as to determine whether the sensed condition of the distributor sleeve 101 is in a delivery stroke, a suction stroke, or an intermediate stroke. If the determination at the step S52 indicates that the pump is in a delivery condition, it moves to the step S53, which is the delivery-stroke mode. If this is the case, the program then moves to the step S54 so as to set a pulse width for the operation of the stepper motor, which is narrower than a standard value m. This will cause the delivery stroke to be performed at a faster speed than the other strokes, and as a result, the volume of the oil pumping chamber 105 is diminished more rapidly so as to reduce the amount of internal leakage.

If, however, at the step S52 it is determined that the pump is in a suction-stroke mode, then the program moves to the step S55 so as to initiate the programming for the suction-stroke mode. This then progresses to the step S56 so as to set a pulse width that is greater than the normal pulse width m so as to cause the suction stroke to occur at a slower rate of speed to prevent induction of air and increase the total amount of lubricant introduced when the pumping chamber 105 is increased in its volume and the suction is occurring.

If at the step S52 it is determined that the pump 82 is neither in a suction-stroke mode nor in a delivery-stroke mode, then the program moves to the step S57, wherein the intermediate-stroke mode is selected. Then at the step S58 the pulse width is set as the standard pulse width m.

The method for changing the speed during the individual suction and delivery strokes, as well as maintaining the standard speed during the intermediate mode, as will become readily apparent to those skilled in the art.

The actual method of calculating the delivery time t for the delivery of lubricant in a quantity Q for each pumping cycle of the pump 82 will now be described in more detail. It should be noted that the quantity Q is the total amount of lubricant delivered by the pump during a single pumping cycle, which can be easily measured. As aforenoted, because of the fact that the pump 82 delivers a finite number of small increments of lubricant, the effects of internal leakage in the pump 82 can be easily-compensated for. The method of making these calculations can be understood best by reference to FIGS. 9, 10, and 14, all of which have been previously referred to. As has been noted, each time the ignition fires or the crankshaft pulsar coil 76 outputs a signal, the map of FIG. 10 is read so as to determine the instantaneous oil consumption at that time interval based upon, in the illustrated embodiment, the throttle opening Thθ and engine speed in r.p.m. The actual vertical, or Z axis, component of the map of FIG. 10 is equivalent to the consumption time t of the delivery amount Q divided by the number of steps necessary to deliver one pump output (four, in the described embodiment). Actually, the consumption time t is calculated beforehand from the amount of lubricant q per unit of time consumed by the engine that is mapped beforehand by actual engine measurements.

Under substantially all conditions, the timing of the ignition pulses as shown in FIG. 9 is more frequent than the actual timing between the driving pulses given to the pump 82. Each time there is an ignition firing, the map of FIG. 10 is read so as to determine the consumption time period t for the delivery amount Q of lubricant supplied by the pump 82 to be consumed by the engine for the given engine speed and throttle opening. This is then converted into a time period a1, a2, etcetera between drive pulses and is stored in a memory. These times are then accumulated and a pump drive pulse A1, A2, A3, will be generated each time the respective time periods a1, a2, and a3 etcetera have elapsed as determined by a counter. Once four drive pulses A1, A2, A3 and A4 have been transmitted in the exemplary embodiment, the pump will output an output b1, b2, etcetera in the amount Q of lubricant. In this way, the memory is constantly updated substituted new data for old data and lubricant supply is very accurately controlled.

Figure 14:
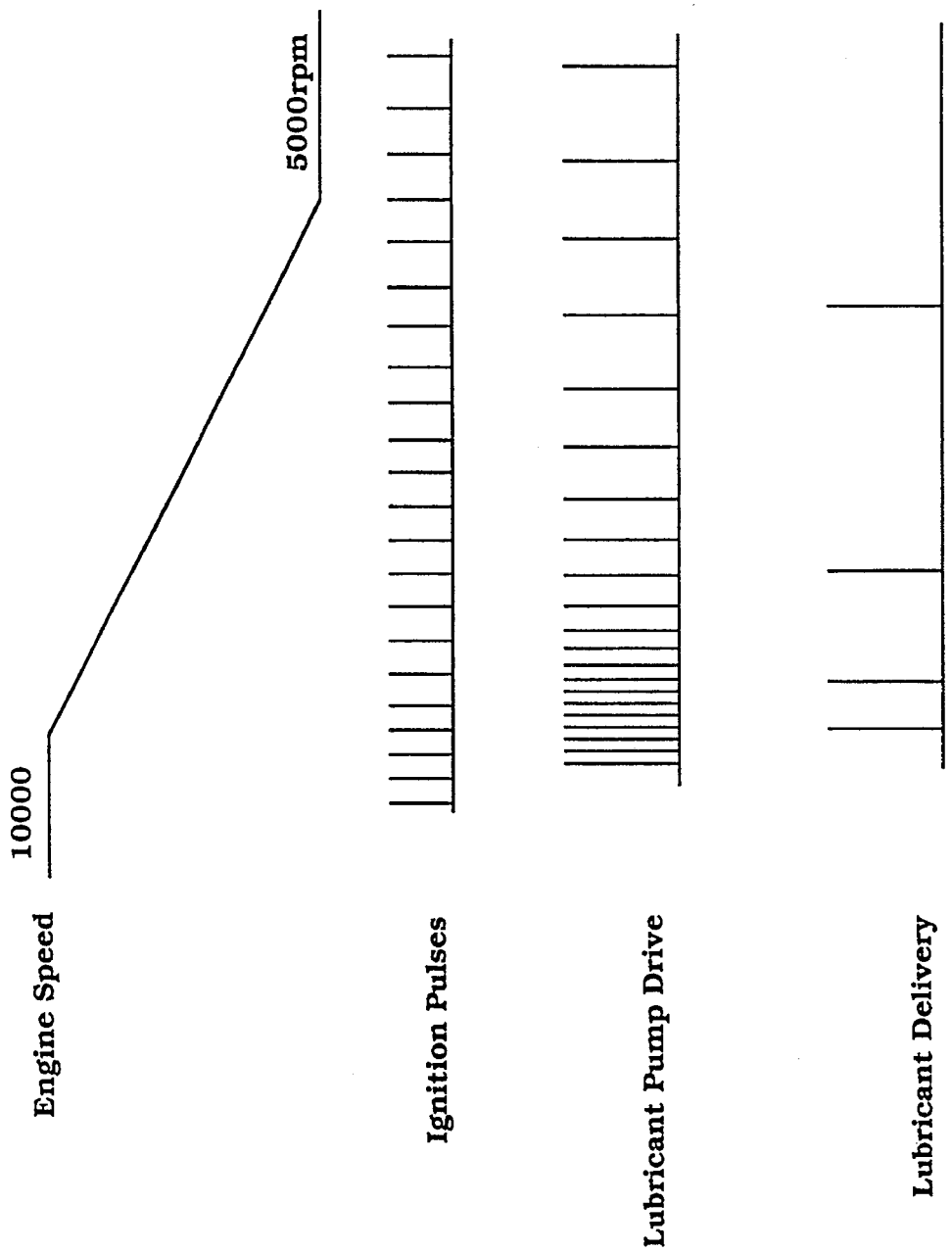
FIG. 14 is a graphical view in relation to time of engine speed, ignition pulses or spark plug firing, lubricant pump driving pulses and lubricant delivery during an engine slow-down cycle.

As may be seen from FIG. 14, as the engine speed is increased, the time period between the ignition pulses becomes less. Thus, the system is able to respond more quickly to variations in oil consumption requirements under the more severe high speed conditions than under the less severe low-speed conditions. Thus, even further accuracy and optimum control is provided.

In the embodiment thus far described, the pump 82 outputs a quantity of lubricant or pumping cycle twice per revolution. FIGS. 18–21 illustrate another embodiment of the invention that has generally the same construction, but in this embodiment there is one pumping stroke per complete revolution of the stepping motor. Thus, this system utilizes only a single-inlet port and a single-outlet port and does not require any internal communication between paired inlet ports. Also, in this embodiment the actual pump plunger serves as the distributor valve rather than requiring the separate rotating sleeve with the timing port, as with the previously described embodiment.

Since there are substantial similarities between the pump of the embodiment of FIGS. 18–21 and the pump of the embodiment of FIGS. 2–6, only components that are different are identified by different reference numerals and will be described in detail. Where components are the same or substantially the same, they are identified by the same reference numerals.

The pump in this embodiment is identified generally by the reference numeral 201 and includes a stepper motor 83, which may have the construction as previously described, and a pump housing made up of the main body member 87 and a cover piece 89, as previously described. The main housing piece 87 has its inlet port 97 disposed at 180 degrees to a single outlet nipple 108, since, as has been previously noted, there is only one pumping cycle per revolution.

A lower insert piece 202 is affixed in the cavity 88 of the lower housing piece 87 by the screws 94, as previously described. The insert piece 202 is provided with a recess 203 at one side, which communicates with the inlet port 97, and has a fixed cross-drilled passageway consisting of an inlet or suction portion 204 and an outlet or discharge portion 205, which are disposed at 180 degrees from each other and which intersect a bore 206. A pump plunger, indicated generally by the reference numeral 207, is rotatably and slidably supported in this bore 206 and has a coaxial bore 208 in its lower end that communicates with a pumping chamber 211 formed between the insert piece 202 and the lower end of the main housing 87.

A radially extending distributor passage 212 extends through the pumping plunger 207 and intersects the counterbore 209. This passage communicates with the insert piece supply port 204 in the position shown in FIGS. 18 and 21 and with the delivery passage 205 when rotated through 180 degrees so as to communicate with the discharge nozzle 208.

The cam mechanism and interconnection between the stepper motor output shaft and the plunger 207 for effecting its rotation and reciprocation is the same as that previously described, and for that reason, all other components, except hereinafter noted, are identified by the reference numerals previously applied and further description of them is not believed to be necessary to understand the construction and operation of this embodiment.

Since the plunger 207 performs only a single stroke per revolution of the stepper motor shaft 111, the cam 118 has only one lobe and one groove, and the pin 114 extends only in one direction from the pumping plunger 207. As a result of this, the pin can contact a leaf spring 212 of a contact switch 213 so as to output the signal indicative of the complete revolution or home position of the pump and one complete pump cycle.

In this particular embodiment, the stepping motor 83 is operated so as to rotate the pumping plunger 207 through 90 degrees during each step of operation. Of course, the mechanism may be changed so as to provide a different degree of angular rotation, depending upon the particular application.

Figure 22:
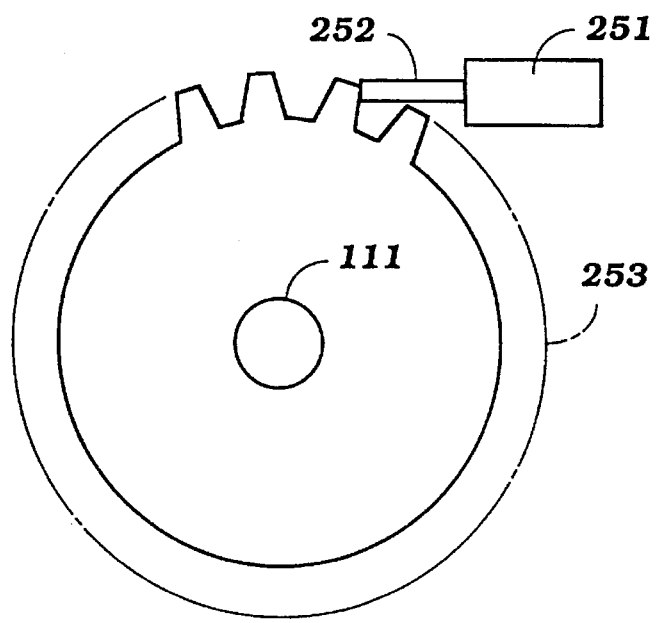
FIG. 22 is a view showing one type of stepper motor that can be employed in conjunction with the invention for driving the lubricant pump.

FIG. 22 shows another type of stepping mechanism that may be employed so as to rotate the distributor valve and pumping plunger of the previous embodiments. In this embodiment a solenoid motor 251 has a plunger 252 that cooperates with teeth 253 of a drive gear affixed to the stepper motor shaft 111 so as to rotate the stepper motor shaft 111 through increments, depending upon the number and spacing of the teeth 253. A suitable ratchet mechanism or one-way clutch can be employed so as to prevent reverse rotation.

In the embodiments of the invention as thus far described, the stepping motor 83, which is employed to drive the lubricant pump and delivery system 82, can be of any conventional nature. However, as has been noted, normal stepping motors are not designed for continuous operation, as called for in this invention, and therefore it is proposed in accordance with another embodiment of the invention to employ an improved type of stepping motor. Furthermore and as has already been noted, the amount of electrical power available requires compensation in the operation of the stepping motor, and also temperature may require compensation. Furthermore, it is desirable to provide varying speeds of rotation during different parts of the operation, and the stepping motor now to be described permits the attainment of all of these functions, and further increases the versatility of the system and the ability to more finely tune the lubricant supply.

Figure 23:
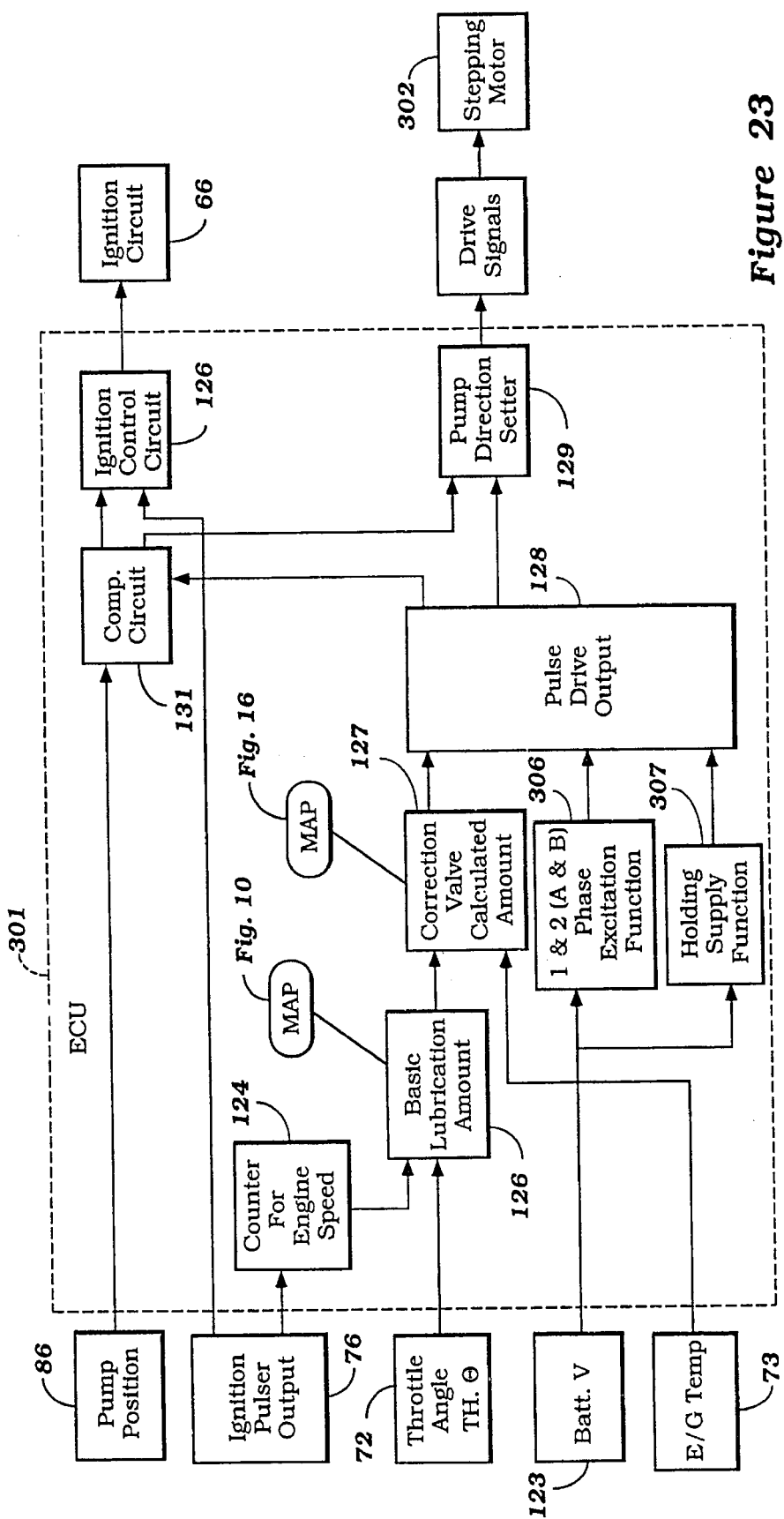
FIG. 23 is a block diagram, in part similar to FIG. 8 shows another embodiment of the invention.

Because of the different type of stepping motor employed in this embodiment, a slightly different ECU type of control and system is employed, and this ECU is shown in block diagram in FIG. 23. In many regards this embodiment is the same as that of FIG. 8, and where those parts are the same or substantially the same, they have been identified by the same reference numerals and will be described again only insofar as is necessary to understand the construction and operation of this embodiment. The actual construction of the stepping motor and its mode of operation will be described later.

The ECU in this embodiment is identified generally by the reference numeral 301, and like the previous embodiments has the same external sensors that provide indication of the position of the lubricant pump (sensor 86); the rotation of the engine output shaft, pulsar coil 76; throttle angle position, as determined by the throttle angle position sensor 72; battery voltage, as determined by a battery-voltage sensor 123; and engine temperature, as sensed by the engine temperature 73. Again, the output signals control the same components in accordance with the lubrication system, and these include the ignition circuit 66 and the stepper motor, which in this embodiment is identified generally by the reference numeral 302.

Figure 24:
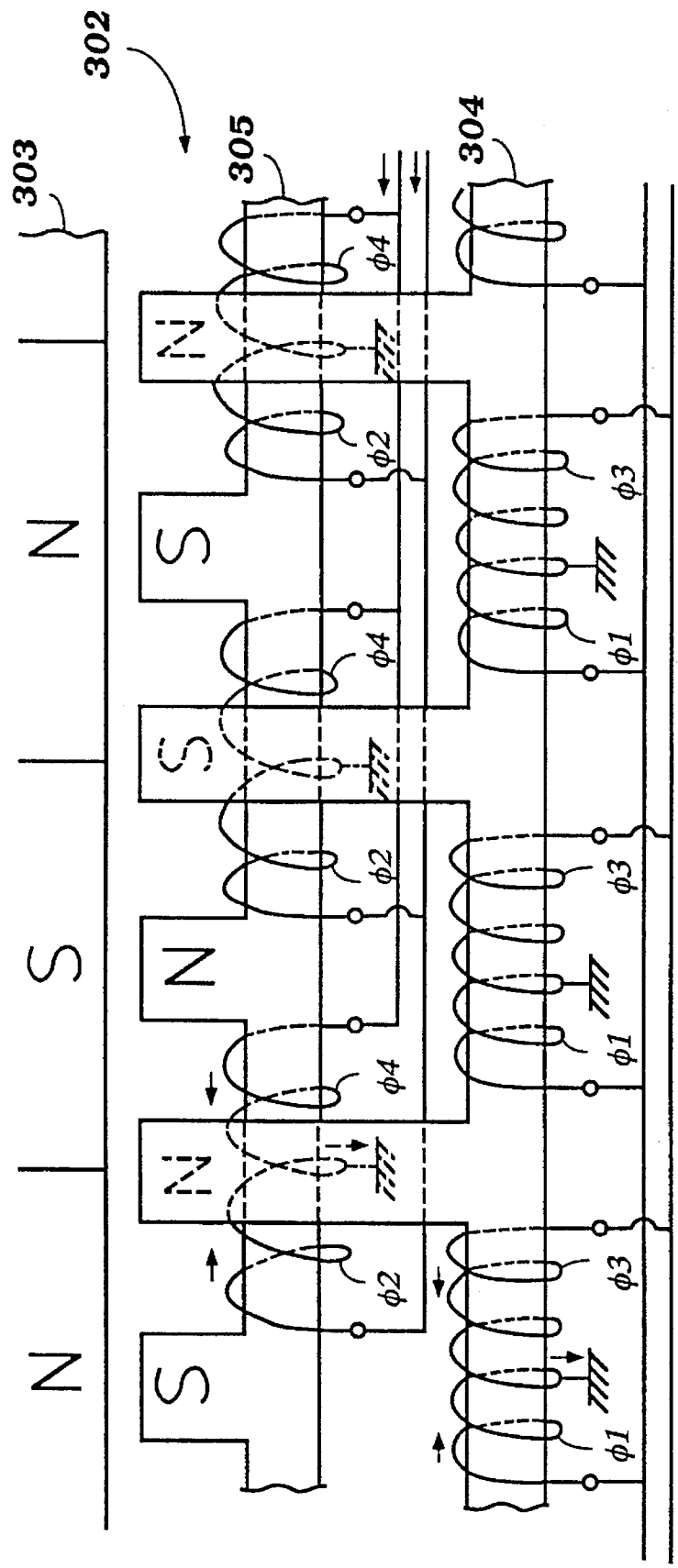
FIG. 24 is a developed view showing the stator windings and rotor of the pulsar motor of this embodiment.

The stepping motor 302 is shown schematically in FIG. 24 and is comprised of a rotor 303, which drives the stepping motor shaft 11t or a pawl-type mechanism for rotating the shaft and which has arranged on its periphery a series of permanent magnets magnetized into multiple poles, as shown therein. Associated with this rotor is a first stator section 304 that has pairs of coils γ1 and γ3 located around the rotor 303. A second stator section having pairs of coils γ2 and γ4 is indicated generally by the reference numeral 305, and is also disposed in proximity to the factor 303. The respective coils have poles, as shown in FIG. 24, and these poles are staggered relative to each other. These pairs of stator sections 304 and 305 and their respective coils are utilized for a purpose that will be described, and this includes a compensation for variations in voltage.

Because the voltage variation is done by utilizing the pairs of stator sections 304 and 305, the correction value calculation in the circuit 127 of the ECU 301 only reads the temperature compensation map of FIG. 16, with the voltage compensation being done separately, as will be described.

The output voltage from the battery signal detector 123 is provided to two additional control circuits of the ECU 301, these being the phase excitation function, indicated schematically at 306, and a holding supply function, indicated at 307. These circuits output their signals also to the pulse drive output circuit 128 in addition to the corrected temperature value received from the circuit 127.

The way in which the voltage variation from the source can be compensated for by this system and also the way in which it is possible to vary the operation and advancement of the rotor 303 will now be described by particular reference to FIGS. 25–27.

Figure 26:
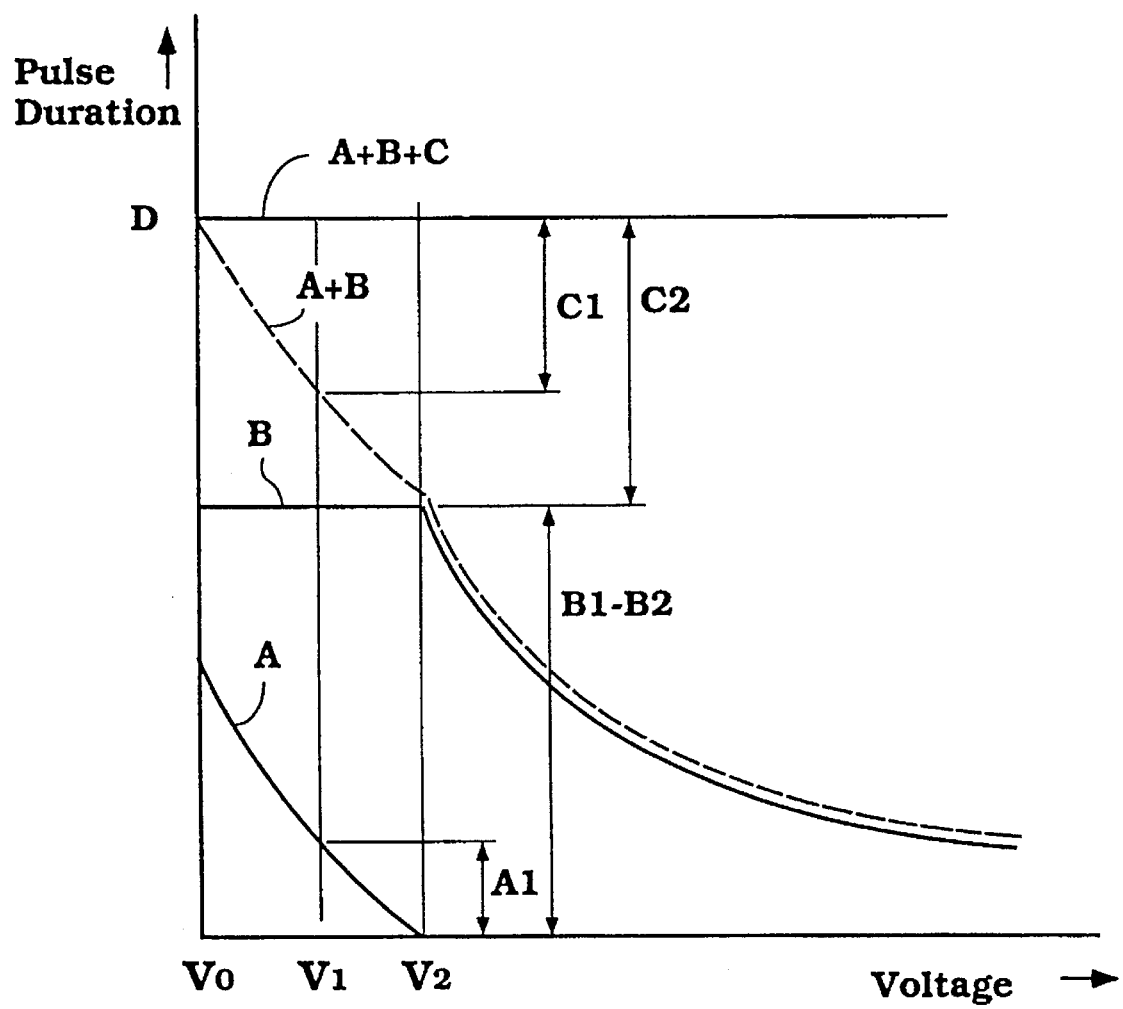
FIG. 26 is a graphical view showing the pulse duration required at various voltage levels with the various control strategies possible with this embodiment.

FIG. 26 is a graphical view that explains how voltage compensation can be accomplished with this system by selectively energizing either the two phase excitation (A), the one phase excitation (B), or a combination of the two of them. This curve shows the total pulse duration D for a given time period of operation of the stepping motor 302. The curve A shows the pulse duration necessary to achieve a given amount of stepping operation by the energization of the two phase excitation while the curve B shows the duration period for stepping operation by the one phase excitation. The curve A+B (the broken curve in this figure) indicates the sum of the effect of the two operations. Where the curve A+B falls below the curve B the difference between the line D and the curve A+B indicates the dwell holding time C.

The voltage value is indicated on the abscissas. It will be seen at the minimum voltage $V_o$ it is necessary to energize both the two phase excitation and the one phase excitation for the respective time periods in order to accomplish complete movement of the stepper motor within the time period D. As the voltage increases from the voltage $V_o$ to the voltage $V_1$, the pulse duration of the two phase excitation can be reduced while holding the one phase excitation constant. This is done to conserve electrical energy and also to reduce the amount of heat generated in the stepper motor. This results in the sum of the durations A and B being less than D and thus at the voltage $V_1$ there is a dwell or holding period $C_1$ during which the holding phase excitation is accomplished. At this voltage $V_1$ the two phase excitation period is only the period $Am_1$ so it will be seen that electrical consumption and heat is substantially reduced.

When the voltage reaches the desired maximum voltage $V_2$ it is no longer necessary to execute the two phase excitation and, therefore, only the single phase excitation occurs for the time period B2. At this time, the holding phase is substantially longer as at C2. Thus, total power consumption and heat are both substantially reduced.

Figure 25:
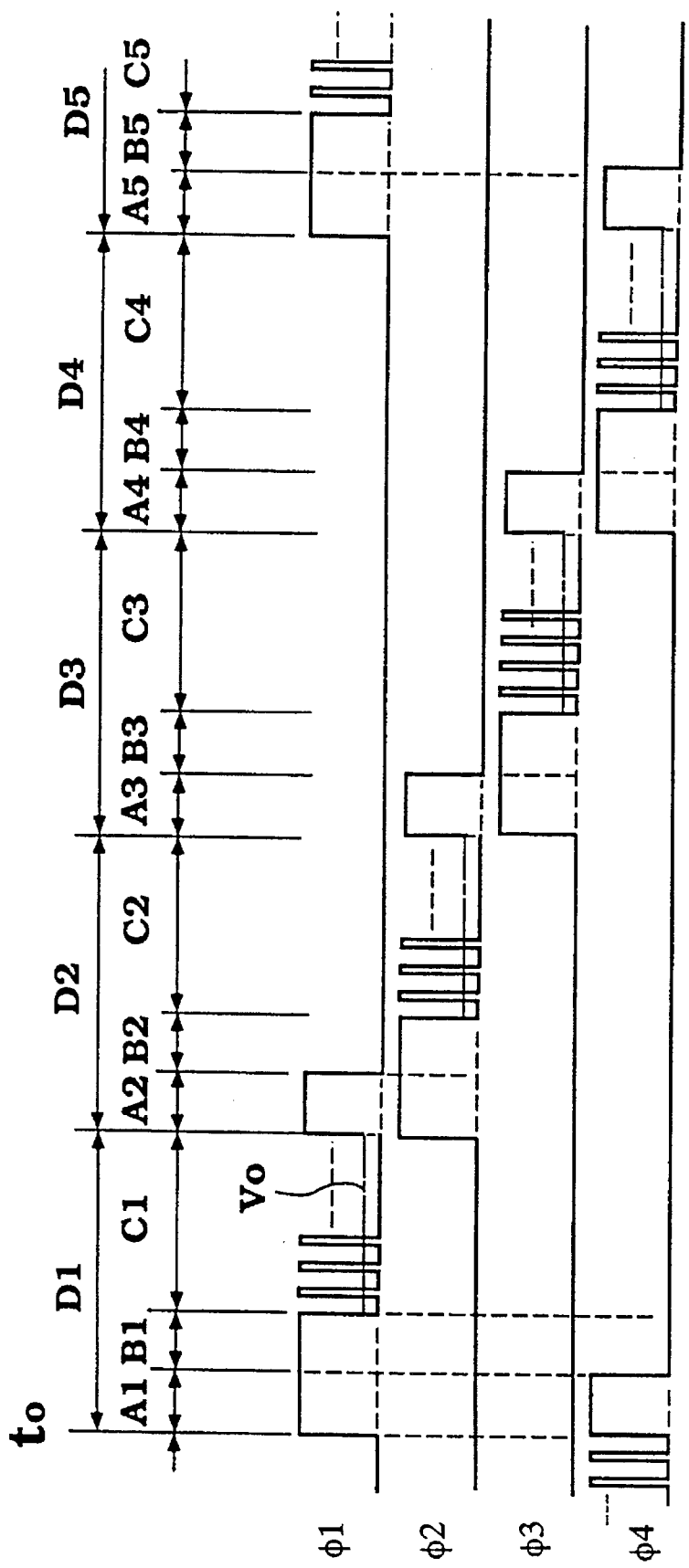
FIG. 25 is a graphical view showing the energization pulses for the various stator windings during a phase of engine operation and shows how the output can be compensated for battery voltage.
Figure 27:
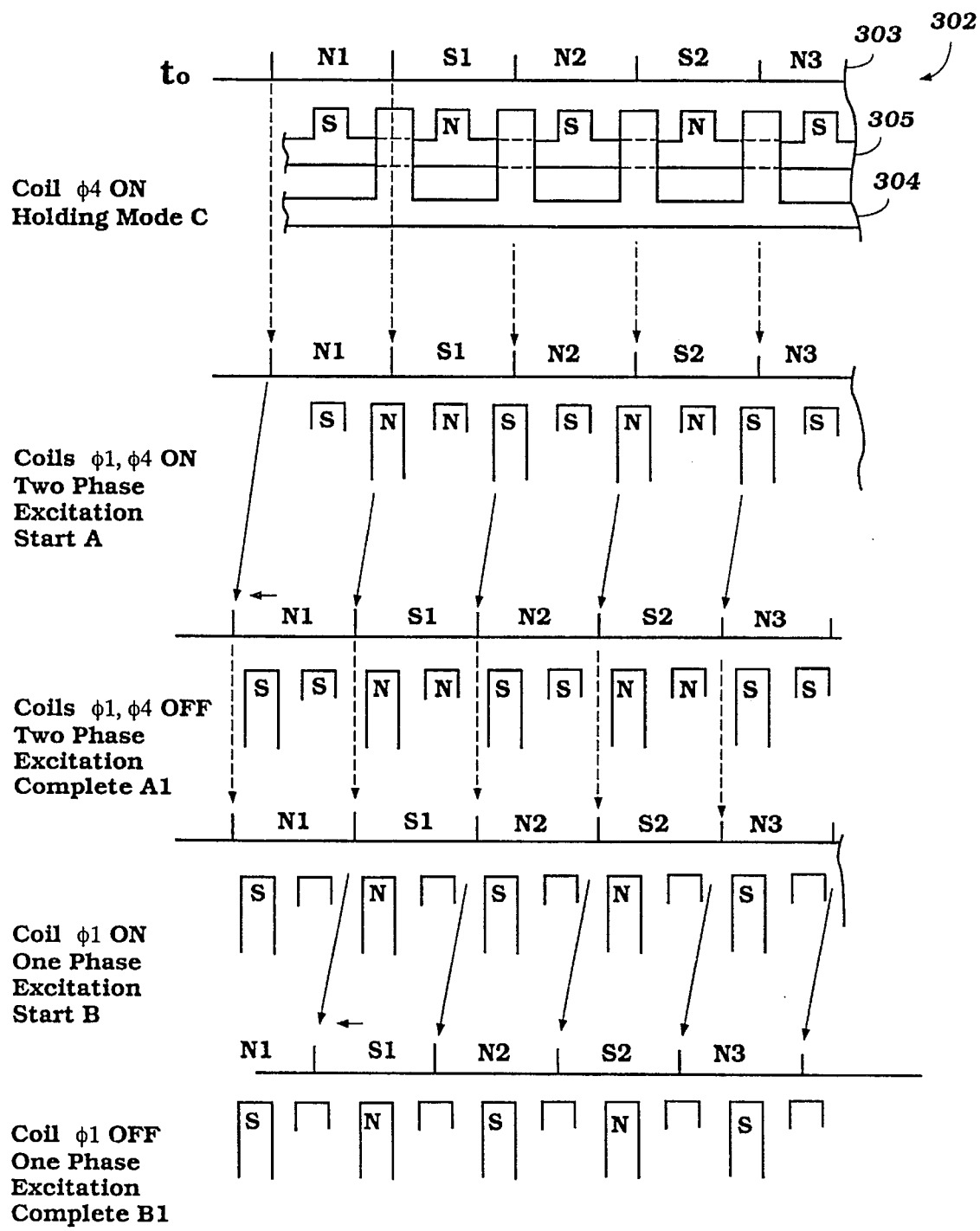
FIG. 27 is a developed view, in part similar to FIG. 24, and shows how the rotor rotates relative to the stator during the various energization and holding cycles.

FIGS. 25 and 27 show on a developed view the effect of this during a cycle of operation. FIG. 27 shows the operation during the time period D1 while FIG. 25 shows successive operations.

At the time $t_o$ the time period the holding phase C of the previous cycle is on and the rotor is in the position relative to the stators as shown in FIG. 27. The two phase excitation is then begun at the point $t_o$ and the effect of this is shown in the next two figures of FIG. 27 wherein the rotor rotates from the position $N_1$ to a new position as the coils $\phi 1$ and $\phi 4$ are excited. This continuous to the point A1 when the two phase excitation is stopped. Then at the point where B1 begins, the coil $\phi 1$ is still excited and additional rotation of the rotor will occur from the point $B_0$ to B1 as shown in FIG. 27. After this, the holding phase is begun by pulsing the coil C1 only to maintain sufficient energization to hold the rotor 33 in position for the remaining time period C1. Of course, the time of excitation will vary from cycle to cycle as the demands of lubricant amount vary and this is shown in FIG. 25.

Figure 28:
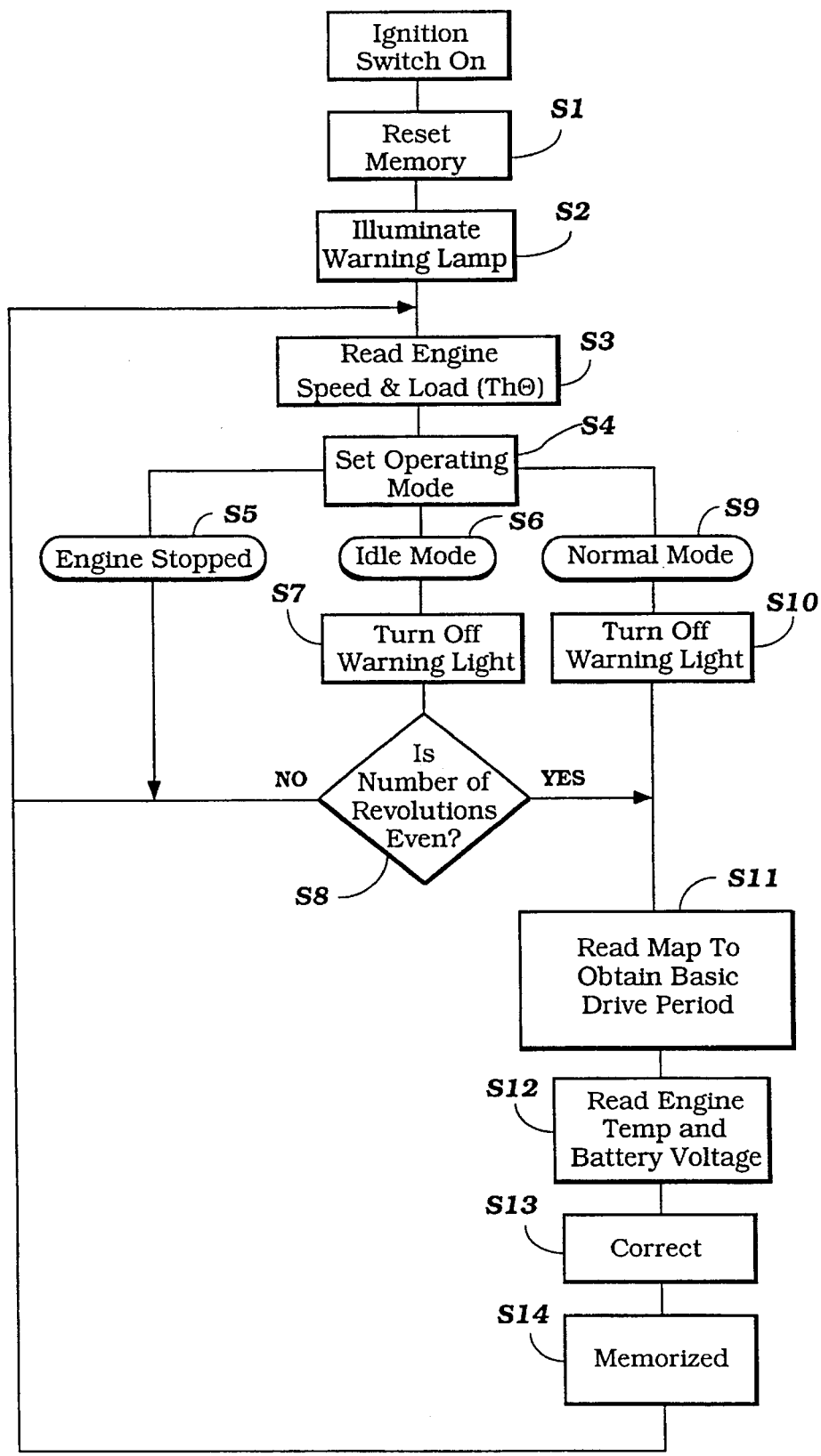
FIG. 28 is a block diagram showing the control routine in accordance with this embodiment of the invention.

The actual control routine will now be described by reference to FIGS. 28, which shows the initial control routine in FIGS. 29 and 30 which show further control routines. Referring first to FIG. 28, the control routine of this embodiment is substantially the same as the control routine of the previously described embodiment as illustrated in FIG. 11. However, the values are arrived at slightly differently, as will be described. For that reason, where the steps are the same or substantially the same as the previously described embodiment, the same reference characters will be applied for the steps.

Again, the program begins when the ignition switch is turned on and then the memory is reset at the step S1 and the warning light is illuminated at the step S2 to provide a self-checking function as aforenoted.

The program then moves to the step S3 so as to read the engine conditions these being speed and load as determined by throttle valve setting in the embodiments described. The program then moves to the step S4 so as to determine the engine running conditions so as to set the operating mode.

If at the step S4 it is determined that the engine speed is zero, then it is determined that the engine is stopped and the engine stopped mode S5 is performed wherein the program repeats back to the step S3.

If at the step S4 it is determined that the engine is operating at idle speed, the program moves to the step S6 to set the engine idle mode and then moves to the step S7 so as to turn off the warning light. The program then moves to the step S8 so as to determine if the number of engine rotations is even or odd for the reason already noted. If the number of revolutions is odd, the program repeats back to the step S3. If, however, the number of engine revolutions is even then the process skips to the step S11, to be described later, so as to set the respective drive pulses.

If at the step S4 it is determined that the engine is operating and at a speed above the idle speed, the program moves to the normal mode of operation beginning at the step S9. The program then moves to the step S10 so as to turn off the warning light.

At the completion of the step S10 or if the step S8 determines an even engine revolution number, the program then moves to the step S11 so as to set the basic pulse drive interval D. This is done at the step S11 wherein the basic drive period is read from a map, such as the map of FIG. 10 previously referred to. The battery voltage and engine temperature are then read at the step S12, for the reasons aforenoted, and the correction factors determined at the step S13 so as to obtain the corrected value of D which is then memorized at the step S14.

Figure 29:
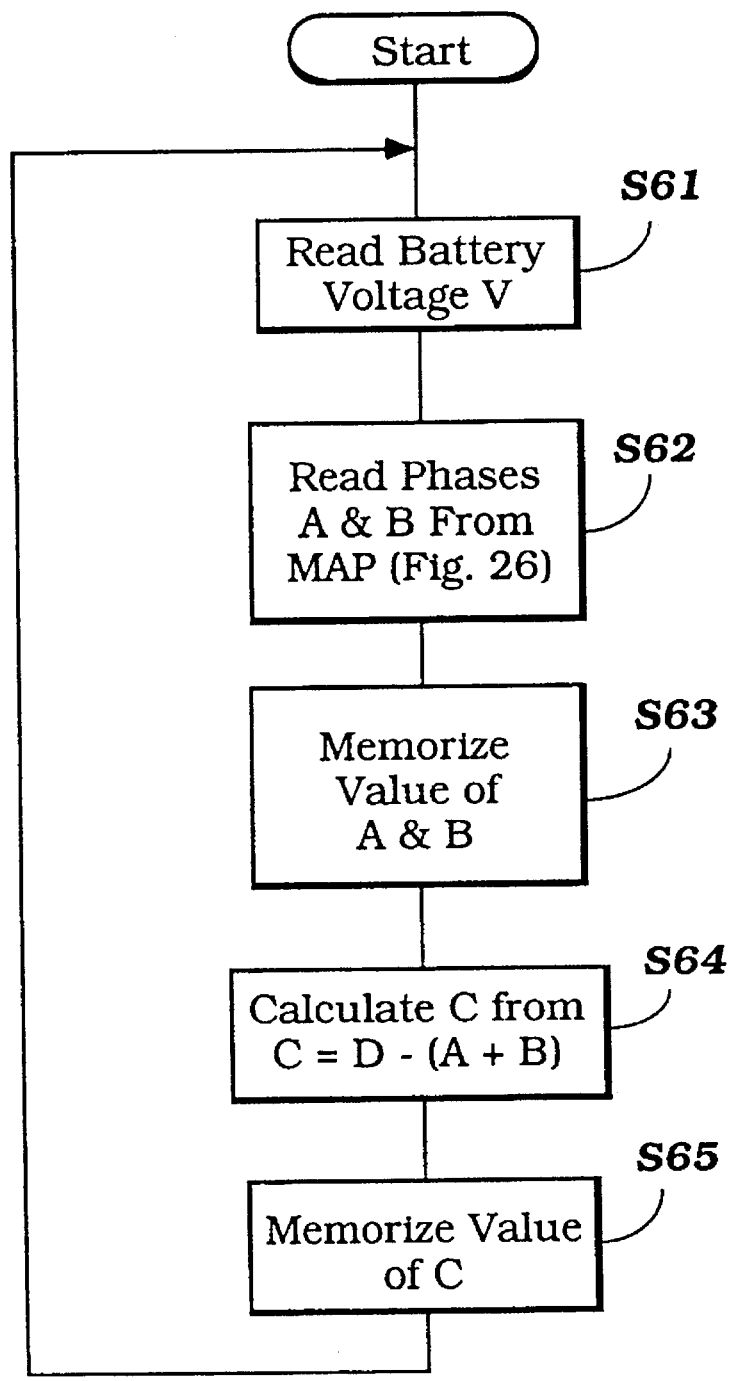
FIG. 29 is a block diagram of a routine showing how the drive pulses and holding pulse are calculated.

Once the basic value for the drive pulse time D is determined, then the program determines the time periods A and B, if both are required, by reference to a control routine as shown in FIG. 29 and using the data from an appropriate map similar to that of FIG. 26 for the desired pulse duration D and the selection of the time durations A for any two phase excitation and B for the one phase excitation as well as how to compute the holding phase excitation period C.

As seen in FIG. 29, when the program starts it moves to the step S61 to read the battery voltage. The program then moves to the step S62 to consult the map such as one of the family of maps as shown in FIG. 26, as aforenoted, to read the two phase excitation drive pulse A and the one-phase excitation pulse B. The program then moves to the step S63 so as to memorize these values of A and B. The program then moves to the step S64 to calculate the holding time C by subtracting from the previous noted value of D determined at step 14 of FIG. 28. The value of C is then memorized at the step S65.

Figure 30:
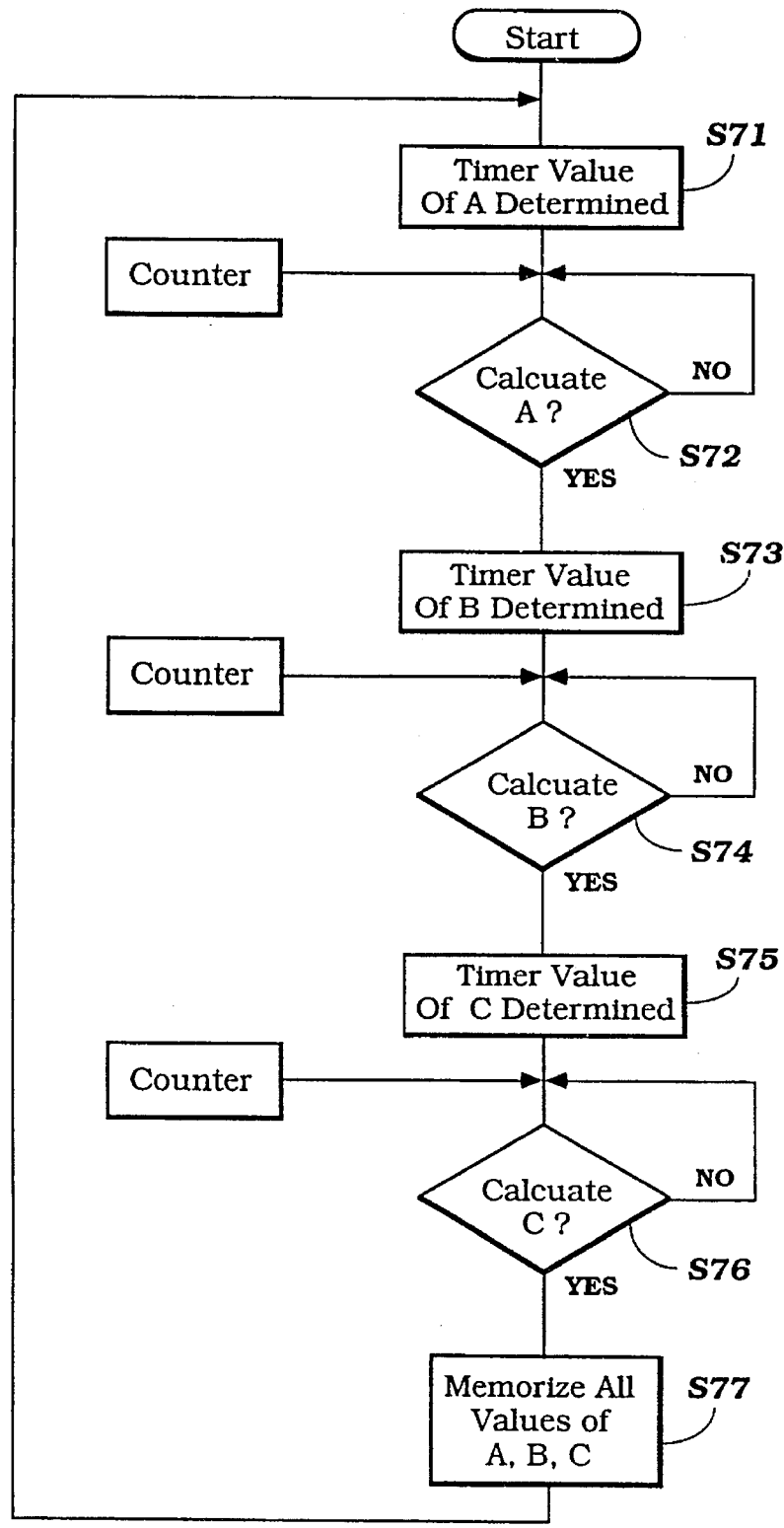
FIG. 30 is a block diagram showing how the driving pulses and holding pulses are converted into timers signals.

The timer values of A, B, and C are then calculated in a manner as shown in FIG. 30. At the step S71, the timer value of A is red from a map like that of FIG. 29. The timer valve (number of counts) is then determined by dividing the value of A by the time intervals of the counter in the CPU 301.

Then the program moves to the step S73 so as to read the value of B from a map like FIG. 26. Then at the step 374 the value of the time B is dividing by the time intervals of the counter of the CPU 301 to determine the requisite number of timer steps.

Then the program moves to the step S75 to calculate the time of the holding phase C. This is done by subtracting from D the sum of A+B. The timer value is then calculated at step 576 by taking the value of C and dividing it by the timer intervals of the counter of the CPU 301.

Once all timer values have been calculated, the program moves to the step S77 so as to output these values.

Figure 7:
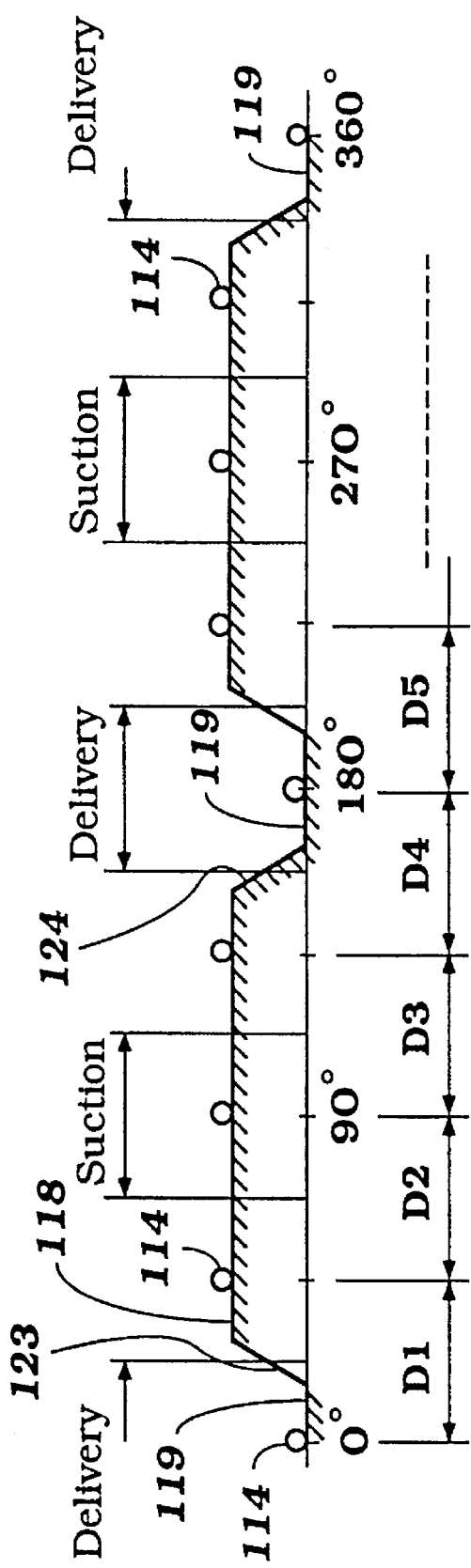
FIG. 7 is a developed view showing the drive cam operation of the lubricant pump.
Figure 31:
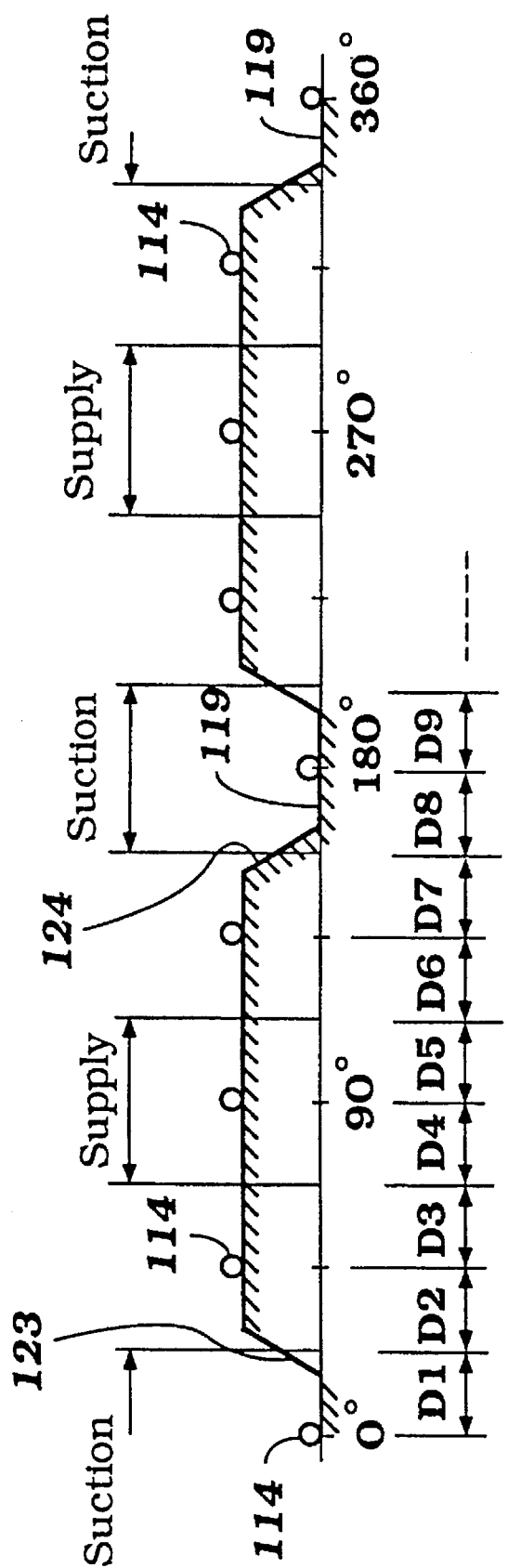
FIG. 31 is a developed view, in part similar to FIG. 7 and shows how the arrangement can be utilized in conjunction with a system wherein the driving pulses are shortened so that there is a dwell period when the pump plunger is in its ramp condition.

As has been previously noted in conjunction with the description of FIG. 7, the ending periods of each of the steps D1, D2, D3, etc. is timed to occur so that the drive pin 114 of the lubricant pump will not be on either of the ramps 123 and 124. Therefore, the holding phase C need only supply sufficient power to provide holding of the stepper motor against many external forces. However, in some instances it may be desirable to employ smaller steps so as to provide even more-accuracy in the control and FIG. 31 shows such a situation wherein the pulse intervals achieve 22.5° of rotation rather than 45° as previously described. Therefore, there are times when the drive pin 114 will be brought to rest on either of the ramps 123 or 124. When this occurs, then it is desirable to ensure that the holding current C is sufficient to resist the action caused by the fact that the drive pin 114 is on one of the ramps 123 and 124. Hence, under these phases the program can be set so as to provide the proper holding current so as to ensure that rotation will not occur due to the cam action.

It should be readily apparent from the foregoing description that the described embodiments of the invention are extremely effective in providing very efficient and quite simple control for the amount of lubricant supplied to a machine such as a two-cycle internal combustion engine. In addition, the control is such that it can respond rapidly and internal pumping losses can be easily accommodated. In addition, the stepper motor construction described in one embodiment is effective in ensuring low power consumption and low heat generation. Of course, the foregoing description is that of preferred embodiments of the invention and various changes and modifications may be made without departing from the spirit and scope of the invention, as defined by the appended claims.

We claim:

1. A system for lubricating a machine comprising a reciprocating pump operable through a fixed range of movement comprising a suction cycle, a dwell cycle, and a delivery cycle for delivering a fixed amount of lubricant only upon movement through said fixed range, a stepper motor for driving said pump in incremental steps of movement each less than said fixed range, a sensor for sensing at least one machine running condition, a lubricant consumption determiner for determining the consumption of lubricant by said machine from the output of said sensor, and an operator for operating said stepper motor to effect a step of movement of said stepper motor upon a predetermined amount of lubricant consumption, said stepper motor having a pair of stator windings having spaced apart coils and wherein the operator is selectively operable to energize respective of said stator windings depending upon predetermined conditions.

2. A system as set forth in claim 1, further including means for operating the stator windings for establishing a holding time during which movement of the stepper motor is precluded.

3. A system as set forth in claim 2, wherein a time duration the various stator windings are energized is varied in response to a condition other than the machine running condition.

4. A system as set forth in claim 3, wherein the other condition comprises the voltage available for powering the stator windings.

5. A system as set forth in claim 4, wherein only one of the stator windings is energized if the voltage is more than a predetermined amount.

6. A system as set forth in claim 5, wherein there is no holding time when the voltage falls below a predetermined amount.

7. A system as set forth in claim 1, further including a timing comparator for comparing the number of pulses generated on the stepper motor to rotate a stepper motor through a predetermined range and a position sensor for sensing a the predetermined position of the stepping motor.

8. A system as set forth in claim 1, wherein the pump further includes a delivery control for controlling the admission of lubricant to a pumping cavity during a suction stroke and for communicating the pumping cavity with the machine during a delivery stroke.

9. A system for lubricating a machine comprising a reciprocating pump operable through a fixed range of movement comprising a suction cycle, a dwell cycle, and a delivery cycle for delivering a fixed amount of lubricant only upon movement through said fixed range, a stepper motor for driving said pump in incremental steps of movement each less than said fixed range, a sensor for sensing at least one machine running condition, a lubricant consumption determiner for determining the consumption of lubricant by said machine from the output of said sensor, and an operator said stepper motor to effect a step of movement of said stepper motor upon a predetermined amount of lubricant consumption and means for operating the operator to reverse the direction of rotation of the stepper motor if a position of the stepper motor after a predetermined number of pulses does not coincide with a position in which the stepper motor should be after the predetermined number of pulses.

10. A system as set forth in claim 9, wherein the operator reinitiates rotation of the stepper motor in the forward direction after a predetermined number of reverse steps and further including means for slowing the speed of the machine if the position at which the stepper motor should be after the predetermined number of pulses does not coincide with the measured position upon resumption of forward drive.

11. A system for lubricating a machine comprising a pump operable through a fixed range of movement for delivering a fixed amount of lubricant only upon movement through said fixed range, a stepper motor for driving said pump in incremental steps of movement each less than said fixed range, a sensor for sensing at least one machine running condition, a lubricant consumption determiner for determining the consumption of lubricant by said machine from the output of said sensor, and an operator for operating said stepper motor to effect a step of movement of said stepper motor upon a predetermined amount of lubricant consumption, said stepper motor having a pair of stator windings having spaced apart coils and wherein the operator is selectively operable to energize respective of said stator windings depending upon predetermined conditions.

12. A system as set forth in claim 11, further including means for operating the operator to reverse the direction of rotation of the stepper motor if a position of the stepper motor after a predetermined number of pulses does not coincide with the position the stepper motor should be in after the predetermined number of pulses.

13. A system as set forth in claim 12, wherein the operator reinitiates rotation of the stepper motor in the forward direction after a predetermined number of reverse steps and further including means for slowing the speed of the machine if the position at which the stepper motor should be after the predetermined number of pulses does not coincide with the measured position upon resumption of forward drive.

14. A system as set forth in claim 11, wherein the pump is comprised of a pump plunger driven by a cam having an inclined surface and rotatable about an axis for reciprocating said plunger.

15. A system as set forth in claim 14, wherein the operator provides a holding force for the stepping motor in the event a step is completed when the cam is on a ramp.

16. A system as set forth in claim 14, further including means for operating the stator windings for establishing a holding time during which movement of the stepper motor is precluded.

17. A system as set forth in claim 14, wherein one of the predetermined conditions comprises the voltage available for powering the stator windings.

18. A system as sew forth in claim 16, wherein only one of the stator windings is energized if the voltage available for powering the stator windings is more than a predetermined amount.

19. A system as set forth in claim 18, wherein there is no holding time when the voltage falls below a predetermined amount.

20. A system for lubricating a machine comprising a pump comprised of a pump plunger driven by a cam having an inclined surface and rotatable about an axis for reciprocating said plunger, said pump being operable through a fixed range of movement for delivering a fixed amount of lubricant only upon movement through said fixed range, a stepper motor for driving said pump cam in incremental steps of movement each less than said fixed range, a sensor for sensing at least one machine running condition, a lubricant consumption determiner for determining the consumption of lubricant by said machine from the output of said sensor, and an operator for operating said stepper motor to effect a step of movement of said stepper motor upon a predetermined amount of lubricant consumption, said operator effecting the stepping movement of said stepper motor to preclude the completion of a step when the cam is on a ramp.

21. A reciprocating pump comprised of a pumping plunger reciprocable in a cylinder for pumping a fluid, a rotary cam rotatable through a predetermined angular position for operating said pumping plunger through a complete stroke of operation, a stepper motor for rotating said cam in angular steps each less than the angular amount required for operation of said pumping plunger through a complete stroke, a sensor for sensing when said pumping plunger is in a predetermined position in its stroke, a counter for counting a number of steps of said stepper motor required for driving said pumping plunger to said predetermined position, and a comparator for comparing said number of steps and the output of said sensor and reversing the direction of rotation of said stepper motor when said number of steps and said output of the sensor do not coincide.

22. A reciprocating pump as set forth in claim 21, wherein the position sensor senses the position of the pump plunger at the completion of its stroke.

23. A reciprocating pump as set forth in claim 22, wherein the number of steps of operation of the stepper motor to drive the pump plunger to its complete stroke is an integer.

24. A method of lubricating a machine comprising a reciprocating pump operable through a fixed range of movement through a suction cycle, a dwell cycle, and a delivery cycle for delivering a fixed amount of lubricant only upon movement through said fixed range and a stepper motor for driving said pump in incremental steps of movement each less than said fixed range, said method comprising the steps of sensing at least one machine running condition, determining the consumption of lubricant by said machine from the output of said sensor, and operating said stepper motor to effect a step of movement of said stepper motor upon a predetermined amount of lubricant consumption, said stepper motor having a pair of stator windings having spaced apart coils and selective of the stator windings are selectively operably energized depending upon predetermined conditions.

25. A method as set forth in claim 24, further including the step of operating the stator windings for establishing a holding time during which movement of the stepper motor is precluded.

26. A method as set forth in claim 25, wherein a time duration the various stator windings are energized is varied in response to a condition other than the machine running condition.

27. A method as set forth in claim 26, wherein the other condition comprises the voltage available for powering the stator windings.

28. A method as set forth in claim 27, wherein only one of the stator windings is energized if the voltage is more than a predetermined amount.

29. A method as set forth in claim 28, wherein there is no holding time when the voltage falls below a predetermined amount.

30. A method as set forth in claim 24, wherein the pump further includes a delivery control for controlling the admission of lubricant to a pumping cavity during a suction track and for communicating the pumping cavity with the machine during a delivery stroke.

31. A method as set forth in claim 24, further including the steps of comparing a number of pulses generated on the stepper motor to rotate the stepper motor through a predetermined range and sensing a predetermined position of the stepping motor.

32. A method as set forth in claim 31, further including reversing the direction of rotation of the stepper motor if the position of the stepper motor after the number of pulses does not coincide with the predetermined position.

33. A method as set forth in claim 32, further including the steps of reinitiating rotation of the stepper motor in the forward direction after a predetermined number of reverse steps and slowing the speed of the machine if the position which the stepper motor should be in after the predetermined number of pulses does not coincide with the measured position upon resumption of forward drive.

34. A method of lubricating a machine comprising a reciprocating pump operable through a fixed range of movement through a suction cycle, a dwell cycle, and a delivery cycle for delivering a fixed amount of lubricant only upon movement through said fixed range and a stepper motor for driving said pump in incremental steps of movement each less than said fixed range, said method comprising the steps of sensing at least one machine running condition, determining the consumption of lubricant by said machine from the output of said sensor, and operating said stepper motor to effect a step of movement of said stepper motor upon a predetermined amount of lubricant consumption, comparing the number of pulses generated on the stepper motor to rotate the stepper motor through a predetermined range and a predetermined position of the stepper motor, and reversing the direction of rotation of the stepper motor if the position of the stepper motor after the number of pulses does not coincide with the predetermined position.

35. A method as set forth in claim 34, further including the steps of reinitiating rotation of the stepper motor in the forward direction after a predetermined number of reverse steps and slowing the speed of the machine if the position which the stepper motor should be after the predetermined number of pulses does not coincide with the measured position upon resumption of forward drive.

36. A method of lubricating a machine comprising a reciprocating pump comprised of a pump plunger driven by a cam having an inclined surface and rotatable about an axis for reciprocating said plunger, said pump being operable through a fixed range of movement for delivering a fixed amount of lubricant only upon movement through said fixed range and a drive for driving said pump in incremental steps of movement each less than said fixed range, said method comprising the steps of sensing at least one machine running condition, determining the consumption of lubricant by said machine from the output of said sensor, and operating said drive to effect a step of movement of said drive upon a predetermined amount of lubricant consumption, said stepping movement of the drive precluding the completion of a step when the cam is on a ramp.

37. A method as set forth in claim 36, wherein the drive comprises a stepper motor including the step of providing a holding force for the stepping motor in the event a step is completed when the cam is on the ramp.

38. A method as set forth in claim 36, wherein the drive comprises a stepper motor has a pair of stator windings has spaced apart coils and wherein the windings are selectively energized depending upon predetermined conditions.

39. A method as set forth in claim 38, further including the steps of operating the stator windings for establishing a holding time during which movement of the stepper motor is precluded.

40. A method as set forth in claim 38, wherein one of the conditions comprises the voltage available for powering the stator windings.

41. A method as set forth in claim 40, wherein only one of the stator windings is energized if the voltage is more than a predetermined amount.

42. A method as set forth in claim 41, wherein there is no holding time during which movement of the stepper motor is precluded when the voltage falls below a predetermined amount.

* * * * *